United States Patent
Pan et al.

(10) Patent No.: US 10,331,018 B2
(45) Date of Patent: Jun. 25, 2019

(54) INTERCHANGEABLE LENS, CAMERA SYSTEM, COMMUNICATION METHOD, AND PROGRAM

(71) Applicant: FUJIFILM Corporation, Tokyo (JP)

(72) Inventors: Yi Pan, Saitama (JP); Junji Hayashi, Saitama (JP); Kazufumi Sugawara, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/943,710

(22) Filed: Apr. 3, 2018

(65) Prior Publication Data

US 2018/0224722 A1    Aug. 9, 2018

Related U.S. Application Data

(63) Continuation of application No. PCT/JP2016/077489, filed on Sep. 16, 2016.

(30) Foreign Application Priority Data

Oct. 20, 2015  (JP) ................. 2015-206719

(51) Int. Cl.
*G03B 3/00*  (2006.01)
*G03B 17/14*  (2006.01)
(Continued)

(52) U.S. Cl.
CPC .............. *G03B 17/14* (2013.01); *G03B 3/00* (2013.01); *G03B 17/56* (2013.01); *G03B 17/565* (2013.01);
(Continued)

(58) Field of Classification Search
CPC ...................................... G03B 3/00
(Continued)

(56) References Cited

U.S. PATENT DOCUMENTS 4,572,638 A * 2/1986 Nakai ............... G03B 7/20
                                                   348/E5.044
4,733,258 A * 3/1988 Kojima ............ G03B 17/14
                                                   396/71
(Continued)

FOREIGN PATENT DOCUMENTS

CN     104950556    *  9/2015    ............ G03B 17/14
JP     2003046818       2/2003
(Continued)

OTHER PUBLICATIONS

Teleside converter, Wikipedia The Free Encyclopedia, This page was last edited on Oct. 16, 2016, at 12:44 (UTC), 1 page.*
(Continued)

*Primary Examiner* — Clayton E. LaBalle
*Assistant Examiner* — Kevin C Butler
(74) *Attorney, Agent, or Firm* — JCIPRNET

(57) ABSTRACT

To provide an interchangeable lens, a camera system, a communication method, and a program in which lens data can be caused to be efficiently stored in an interchangeable lens, necessity of storing the lens data in the accessory can be eliminated by storing lens data in a case where an accessory is not mounted on the interchangeable lens and lens data in a case where the accessory is mounted on the interchangeable lens, and it is unnecessary to have a particular function of transmitting appropriate lens data to the accessory. An interchangeable lens includes a specifying unit that specifies a mounted accessory by acquiring identification information from the accessory, a storage unit including a first storage area that stores first lens data and a second storage area that stores one or a plurality of pieces of second lens data, a third lens data generation unit, and a lens control unit.

20 Claims, 11 Drawing Sheets

(51) Int. Cl.
  *G03B 17/56* (2006.01)
  *H04N 5/225* (2006.01)
  *G03B 17/02* (2006.01)
(52) U.S. Cl.
  CPC ........... *H04N 5/2254* (2013.01); *G03B 17/02* (2013.01); *H04N 5/2253* (2013.01)
(58) Field of Classification Search
  USPC ........................................................ 396/529
  See application file for complete search history.

(56) References Cited

U.S. PATENT DOCUMENTS

| | | | | |
|---|---|---|---|---|
| 4,758,854 | A * | 7/1988 | Saegusa ................. | G03B 17/14 396/529 |
| 4,963,910 | A * | 10/1990 | Ishimura ................. | G02B 7/28 396/125 |
| 5,748,999 | A * | 5/1998 | Ueda ...................... | G03B 17/14 396/91 |
| 5,765,055 | A * | 6/1998 | Miyazawa ............. | G03B 17/14 396/137 |
| 5,809,354 | A * | 9/1998 | Miyazawa ............. | G03B 17/14 396/301 |
| 5,822,632 | A * | 10/1998 | Miyazawa ............. | G03B 17/14 396/529 |
| 2006/0165401 | A1* | 7/2006 | Doi ........................ | G03B 17/56 396/71 |
| 2012/0033955 | A1* | 2/2012 | Okada ..................... | G02B 7/14 396/71 |
| 2012/0044407 | A1* | 2/2012 | Murashima ............ | G03B 13/36 348/345 |
| 2012/0163786 | A1* | 6/2012 | Murashima ............ | G03B 13/36 396/91 |
| 2015/0070521 | A1* | 3/2015 | Yasuda ................ | H04N 5/2254 348/211.1 |

FOREIGN PATENT DOCUMENTS

| | | | |
|---|---|---|---|
| JP | 2010204430 | | 9/2010 |
| JP | 2010226666 | | 10/2010 |
| JP | 2010261984 | * 11/2010 | .............. G02B 7/02 |
| JP | 5208169 | | 6/2013 |
| JP | 5413416 | | 2/2014 |

OTHER PUBLICATIONS

Teleconverter, Wikipedia The Free Encyclopedia, This page was last edited on Jul. 7, 2018, at 19:26 (UTC)., 1 page.*
Nikon, Using Teleconverters, Mark Alaberhasky & Carol Freeman, Oct. 3, 2018, 4 pages.*
"International Search Report (Form PCT/ISA/210) of PCT/JP2016/077489", dated Dec. 20, 2016, with English translation thereof, pp. 1-5.
"International Preliminary Report on Patentability (Form PCT/IPEA/409)", published on Oct. 3, 2017, with English translation thereof, pp. 1-10.

* cited by examiner

FIG. 10

TELECONVERTER CATEGORY-SPECIFIC INFORMATION
DATA MANAGEMENT TBL

| Element No. | Packet No. | Offset | Size | TcData Addr |
|---|---|---|---|---|
| 0 | 1 | 512 | 512 | 0 |
| 1 | 2 | 0 | 1024 | 512 |
| 2 | 2 | 1536 | 512 | 1536 |
| 3 | 3 | 0 | 1024 | 2048 |
| 4 | 3 | 1536 | 512 | 3072 |
| 5 | 4 | 0 | 2048 | 3584 |
| 6 | 5 | 0 | 1024 | 5632 |
| 7 | 6 | 1536 | 512 | 6656 |

Element No.   TELECONVERTER DIVISION DATA No.
Packet No.    PACKET No. TO BE TRANSMITTED
Offset        OFFSET FROM HEAD OF CURRENT PACKET
Size          REPLACEMENT SIZE
TcData Addr   TcData ADDRESS (B)

(A)

ID LENS, CAMERA
INTERCHANGEABLE LENS, CAMERA SYSTEM, COMMUNICATION METHOD, AND PROGRAM

CROSS-REFERENCE TO RELATED APPLICATIONS

This application is a Continuation of PCT International Application No. PCT/JP2016/077489 filed on Sep. 16, 2016, which claims priority under 35 U.S.C § 119(a) to Japanese Patent Application No. 2015-206719 filed on Oct. 20, 2015. Each of the above application(s) is hereby expressly incorporated by reference, in its entirety, into the present application.

BACKGROUND OF THE INVENTION

1. Field of the Invention

The present invention relates to an interchangeable lens, a camera system, a communication method, and a program, and more particularly, to an interchangeable lens, a camera system, a communication method, and a program in which storage and communication of lens data are performed.

2. Description of the Related Art

In the related art, an interchangeable lens camera including an interchangeable lens that is a lens detachable from a camera body has become widespread. In general, a plurality of types of interchangeable lenses are prepared, and a user can select the interchangeable lens according to his or her preference and mount the interchangeable lens on the camera body. The camera body of the interchangeable lens camera acquires lens data of the mounted interchangeable lens by communicating with the interchangeable lens, and performs a process suitable for the mounted interchangeable lens to acquire a captured image with high image quality.

Further, accessories for realizing imaging desired by a user by being mounted on an interchangeable lens as represented by a teleconversion lens are widespread. In a case where the accessory is mounted on the interchangeable lens, the camera body realizes acquisition of a high-quality captured image by acquiring lens data corrected for a case where the accessory is mounted.

For example, Japanese Patent No. 5413416 discloses a technology in which an accessory (an adapter) generates lens data for body transmission to be transmitted to a camera body (a camera body) on the basis of lens data received from an interchangeable lens according to a request from the camera body, and transmits the generated lens data for body transmission to the camera body.

Further, for example, Japanese Patent No. 5208169 discloses a technology in which a communication cutoff switch is provided in an accessory, the communication cutoff switch is operated according to an interchangeable lens to be mounted, and switching occurs between a case where the interchangeable lens and the camera body communicate directly and a case where information processing means provided in the accessory is interposed in communication between the interchangeable lens and the camera body.

SUMMARY OF THE INVENTION

However, in the technology described Japanese Patent No. 5413416, since the adapter performs conversion of the lens data acquired from the interchangeable lens, information for data conversion should be stored in the adapter, and the adapter should have a large storage capacity.

Further, in the technology described in Japanese Patent No. 5208169, since a communication cutoff switch is provided in the adapter and a communication path is switched according to a type of the interchangeable lens, the communication cutoff switch should be provided in the adapter, and the adapter is large.

The present invention has been made in view of the above circumstances, and an object of the present invention is to provide an interchangeable lens, a camera system, a communication method, and a program in which lens data can be caused to be efficiently stored in an interchangeable lens, necessity of storing the lens data in the accessory can be eliminated by storing lens data in a case where an accessory is not mounted on the interchangeable lens and lens data in a case where the accessory is mounted on the interchangeable lens, and it is unnecessary to have a particular function of transmitting appropriate lens data to the accessory.

An interchangeable lens according to an aspect of the present invention for achieving the object is an interchangeable lens including: a first mount including a plurality of terminals on which an accessory or a camera body is mounted; a specifying unit that determines whether or not the accessory is mounted on the first mount and specifies the mounted accessory by acquiring identification information from the accessory in a case where it is determined that the accessory is mounted; a storage unit including a first storage area for storing first lens data which is lens data in a case where the accessory is not mounted, and a second storage area for storing one or a plurality of pieces of second lens data, the second lens data being differential data between lens data in a case where the accessory is mounted, the lens data being obtained by correcting the first lens data on the basis of optical characteristics of the accessory, and the first lens data; a third lens data generation unit that generates third lens data that is lens data obtained by correcting the first lens data on the basis of the optical characteristics of the accessory using the second lens data as the differential data and the first lens data; and a lens control unit that transfers the first lens data stored in the storage unit or the third lens data generated by the third lens data generation unit to the camera body on the basis of a result output from the specifying unit in a case where there is a lens data acquisition request from the camera body.

According to this aspect, since the lens data (first lens data) in a case where the accessory is not mounted and the lens data in a case where the accessory is mounted are stored in the storage unit of the interchangeable lens by the differential data (second lens data), it is unnecessary for the lens data (the second lens data or the third lens data) in a case where the accessory is mounted to be stored in the accessory mounted on the interchangeable lens.

Further, according to the aspect, the lens data stored in the storage unit of the interchangeable lens is the second lens data that is differential data between the lens data obtained by correcting the first lens data on the basis of the optical characteristics of the accessory and the first lens data. Therefore, in this aspect, it is possible to efficiently use the storage capacity of the storage unit of the interchangeable lens. Further, according to the aspect, the third lens data which is lens data obtained by correcting the first lens data on the basis of the optical characteristics of the accessory is generated using the second lens data which is the differential data stored in the storage unit, and the third lens data is transferred to the camera body. Thus, in the aspect, it is not necessary to newly provide a function of generating full data from the differential data in the accessory or the camera body.

Preferably, the lens control unit transfers the first lens data stored in the storage unit to the camera body in a case where the specifying unit determines that the accessory is not mounted on the first mount, and transfers the third lens data to the camera body in a case where the specifying unit determines that the accessory is mounted on the first mount and the second lens data corresponding to the accessory specified by the specifying unit is stored in the storage unit.

According to the aspect, the lens control unit transfers the first lens data stored in the storage unit to the camera body in a case where the specifying unit determines that the accessory is not mounted on the first mount, and transfers the third lens data to the camera body in a case where the specifying unit determines that the accessory is mounted on the first mount and the second lens data corresponding to the accessory specified by the specifying unit is stored in the storage unit. Accordingly, according to the embodiment, appropriate lens data can be transmitted to the camera body according to a case where the accessory is not mounted on the interchangeable lens and a case where the corresponding second lens data is stored in the interchangeable lens.

Preferably, the interchangeable lens further includes a second lens data acquisition unit that acquires new second lens data to be written to the second storage area of the storage unit; and a writing unit that writes the second lens data acquired by the second lens data acquisition unit to the second storage area of the storage unit.

According to the aspect, since new second lens data for writing to the second storage area is acquired and written to the second storage area, it is possible to cope with a new accessory in which the corresponding second lens data is not stored.

Preferably, in a case where the second lens data corresponding to the accessory specified by the specifying unit is not stored in the storage unit, the lens control unit acquires the second lens data using the second lens data acquisition unit, and the writing unit writes the second lens data to the second storage area of the storage unit.

According to the aspect, since the third lens data is transferred to the camera body on the basis of the newly written second lens data, it is possible to realize imaging corresponding to a new accessory in the camera body.

Preferably, the second lens data acquisition unit acquires the second lens data from the camera body.

According to the aspect, it is possible to acquire the second lens data to be stored in the second storage area of the interchangeable lens via the camera body, and to acquire various types of lens data.

Preferably, the interchangeable lens further includes: a second lens data generation unit that calculates the second lens data on the basis of data acquired from the camera body, and the second lens data acquisition unit acquires the second lens data from the second lens data generation unit.

According to the aspect, since the second lens data generation unit generates the second lens data on the basis of the data acquired from the camera body, it is possible to acquire the second lens data even in a case where desired second lens data is not stored.

Preferably, the writing unit overwrites the second lens data stored in the storage unit with the second lens data acquired by the second lens data acquisition unit according to a capacity in which storage is allowed in the storage unit.

According to this aspect, in a case where new second lens data is written, the second lens data already stored in the storage unit is overwritten with the new second lens data according to the capacity in which storage is allowed in the storage unit. Thus, in the aspect, it is possible to effectively use the second storage capacity in which the second lens data is stored.

Preferably, in a case where the second lens data to be written to the storage unit is version-up of the second lens data already stored in the storage unit, the writing unit overwrites the second lens data stored in the storage unit with the second lens data acquired by the second lens data acquisition unit.

According to this aspect, in a case where version-up of the second lens data already stored in the storage unit is performed, the second lens data already stored which is a version-up target is overwritten.

A camera system according to another aspect of the present invention is a camera system including at least an interchangeable lens and a camera body, wherein the interchangeable lens includes a first mount including a plurality of terminals on which an accessory or a camera body is mounted; a specifying unit that determines whether or not the accessory is mounted on the first mount and specifies the mounted accessory by acquiring identification information from the accessory in a case where it is determined that the accessory is mounted; a storage unit including a first storage area for storing first lens data which is lens data in a case where the accessory is not mounted, and a second storage area for storing one or a plurality of pieces of second lens data, the second lens data being differential data between lens data in a case where the accessory is mounted, the lens data being obtained by correcting the first lens data on the basis of optical characteristics of the accessory, and the first lens data; a third lens data generation unit that generates third lens data that is lens data obtained by correcting the first lens data on the basis of the optical characteristics of the accessory using the second lens data as the differential data and the first lens data; a lens control unit that transfers the first lens data stored in the storage unit or the third lens data generated by the third lens data generation unit to the camera body on the basis of a result output from the specifying unit in a case where there is a lens data acquisition request from the camera body; a second lens data acquisition unit that acquires new second lens data to be written to the second storage area of the storage unit; and a writing unit that writes the second lens data acquired by the second lens data acquisition unit to the second storage area of the storage unit, the lens control unit acquires the second lens data from the camera body using the second lens data acquisition unit in a case where the second lens data corresponding to the accessory specified by the specifying unit is not stored in the storage unit, the camera body includes a second mount including a plurality of terminals on which the interchangeable lens or the accessory is mounted; an external input unit to which the second lens data is input; and a camera data communication control unit that controls communication of data with the interchangeable lens, and the camera data communication control unit transmits the second lens data input by the external input unit to the interchangeable lens.

According to this aspect, in a case where the second lens data corresponding to the accessory mounted on the interchangeable lens is not stored in the storage unit, the interchangeable lens acquires, from the camera body, the second lens data input from the external input unit of the camera body, and the acquired second lens data is written to the second storage area.

Preferably, the camera body includes a display unit, a selection reception unit that receives a selection of a user;

and a display control unit that controls a display on the display unit, the lens control unit of the interchangeable lens transmits data regarding a type of the second lens data already stored in the storage unit to the camera body in a case where the capacity in which storage is allowed in the storage unit is smaller than a necessary capacity of the second lens data acquired by the second lens data acquisition unit, the display control unit of the camera body acquires the data regarding the type of second lens data stored in the storage unit via the camera data communication control unit and displays the data regarding the type of second lens data stored in the storage unit on the display unit, the selection reception unit of the camera body receives a selection of one type from types of second lens data displayed on the display unit, and the writing unit of the interchangeable lens overwrites the second lens data received by the selection reception unit with the second lens data acquired by the second lens data acquisition unit.

According to this aspect, in a case where the storage capacity of the second area is already satisfied and a case where new second lens data is overwritten, the user can be caused to select the second lens data by causing the second lens data to be displayed on the display unit of the camera body.

A communication method according to another aspect of the present invention is a communication method of an interchangeable lens including a first mount including a plurality of terminals on which an accessory or a camera body is mounted, and a storage unit including a first storage area for storing first lens data which is lens data in a case where the accessory is not mounted, and a second storage area for storing one or a plurality of pieces of second lens data, the second lens data being differential data between lens data in a case where the accessory is mounted, the lens data being obtained by correcting the first lens data on the basis of optical characteristics of the accessory, and the first lens data, the communication method including: a step of determining whether or not the accessory is mounted on the first mount and specifying the mounted accessory by acquiring identification information from the accessory in a case where it is determined that the accessory is mounted; a step of generating third lens data that is lens data obtained by correcting the first lens data on the basis of the optical characteristics of the accessory using the second lens data as the differential data and the first lens data; and a step of transferring the first lens data stored in the storage unit or the third lens data generated in the third lens data generation step to the camera body on the basis of a result output in the specifying step in a case where there is a lens data acquisition request from the camera body.

A program that is another aspect of the present invention is a program for performing communication of an interchangeable lens including a first mount including a plurality of terminals on which an accessory or a camera body is mounted, and a storage unit including a first storage area for storing first lens data which is lens data in a case where the accessory is not mounted, and a second storage area for storing one or a plurality of pieces of second lens data, the second lens data being differential data between lens data in a case where the accessory is mounted, the lens data being obtained by correcting the first lens data on the basis of optical characteristics of the accessory, and the first lens data, the program causing a computer to execute: a step of determining whether or not the accessory is mounted on the first mount and specifying the mounted accessory by acquiring identification information from the accessory in a case where it is determined that the accessory is mounted; a step of generating third lens data that is lens data obtained by correcting the first lens data on the basis of the optical characteristics of the accessory using the second lens data as the differential data and the first lens data; and a step of transferring the first lens data stored in the storage unit or the third lens data generated in the third lens data generation step to the camera body on the basis of a result output in the specifying step in a case where there is a lens data acquisition request from the camera body.

According to the present invention, since the lens data (first lens data) in a case where the accessory is not mounted and the lens data in a case where the accessory is mounted are stored in the storage unit of the interchangeable lens by the differential data (second lens data), it is unnecessary for the lens data (the second lens data or the third lens data) in a case where the accessory is mounted to be stored in the accessory mounted on the interchangeable lens. Further, according to the present invention, since the lens data stored in the storage unit of the interchangeable lens is the second lens data that is differential data between the lens data obtained by correcting the first lens data on the basis of the optical characteristics of the accessory and the first lens data, it is possible to efficiently use the storage capacity of the storage unit. Further, according to the present invention, since the third lens data which is lens data obtained by correcting the first lens data on the basis of the second lens data which is the stored differential data and the optical characteristics of the accessory is generated, and the third lens data is transferred to the camera body, it is not necessary to newly provide a function of generating full data from the differential data in the accessory or the camera body.

BRIEF DESCRIPTION OF THE DRAWINGS

FIG. 10 is a diagram illustrating original lens data and differential data, where part (A) of FIG. 10 conceptually illustrates an example of a data configuration of original lens data, and part (B) of FIG. 10 illustrates a category-specific information management table of differential data.

DESCRIPTION OF THE PREFERRED EMBODIMENTS

Hereinafter, embodiments of the present invention will be described in detail with reference to the accompanying drawings. Note that in the embodiment, a case where an accessory in the present invention is a teleconverter (a teleconversion lens) will be described. However, in the present invention, the accessory may be a wide converter (a wide conversion lens), a mount adapter, an antivibration adapter, or a macro extension tube. In the following description, "teleconverter" may be appropriately abbreviated as a "teleconverter".

Figure 1:
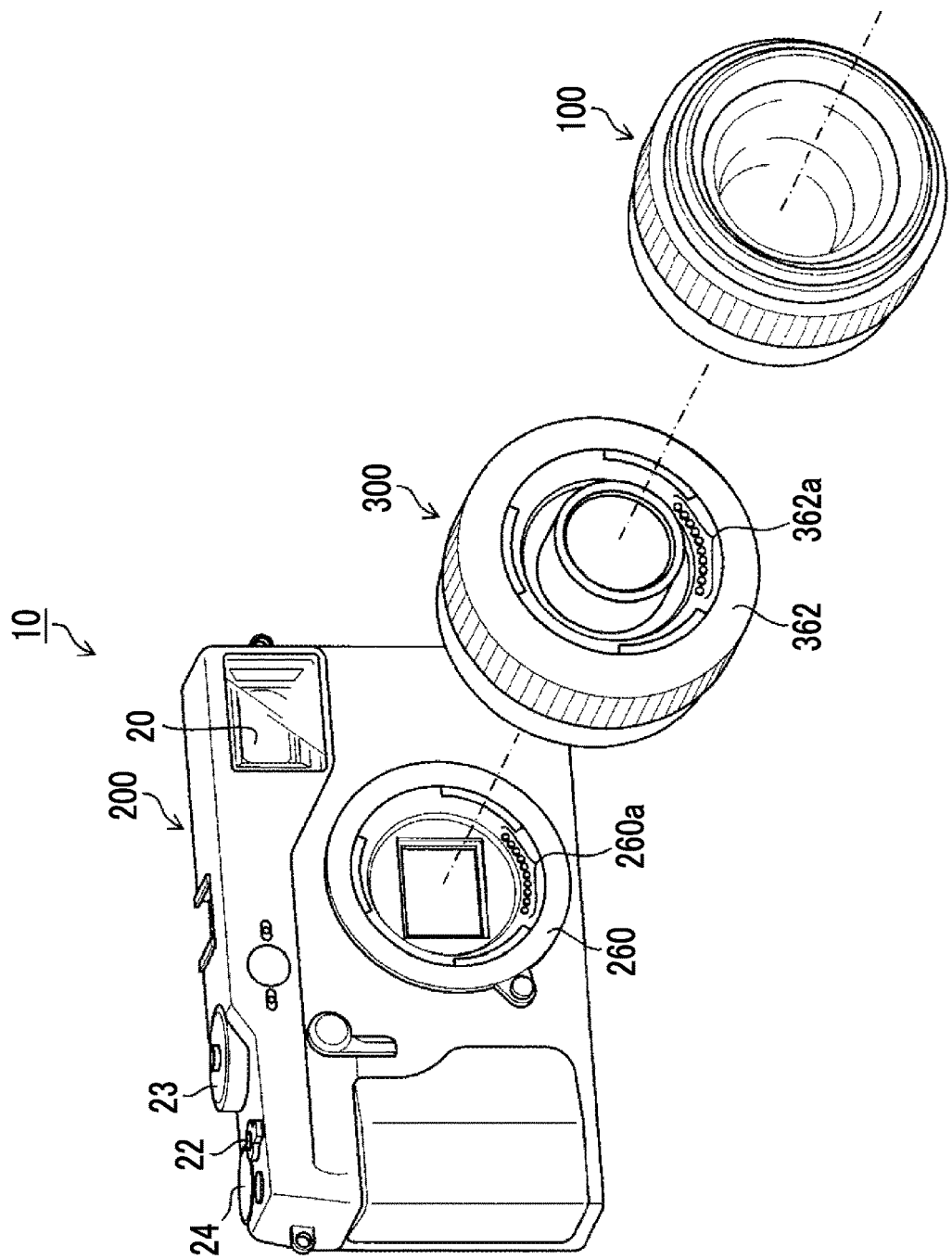
FIG. 1 is an external perspective view of a camera system according to an embodiment of the present invention.
Figure 2:
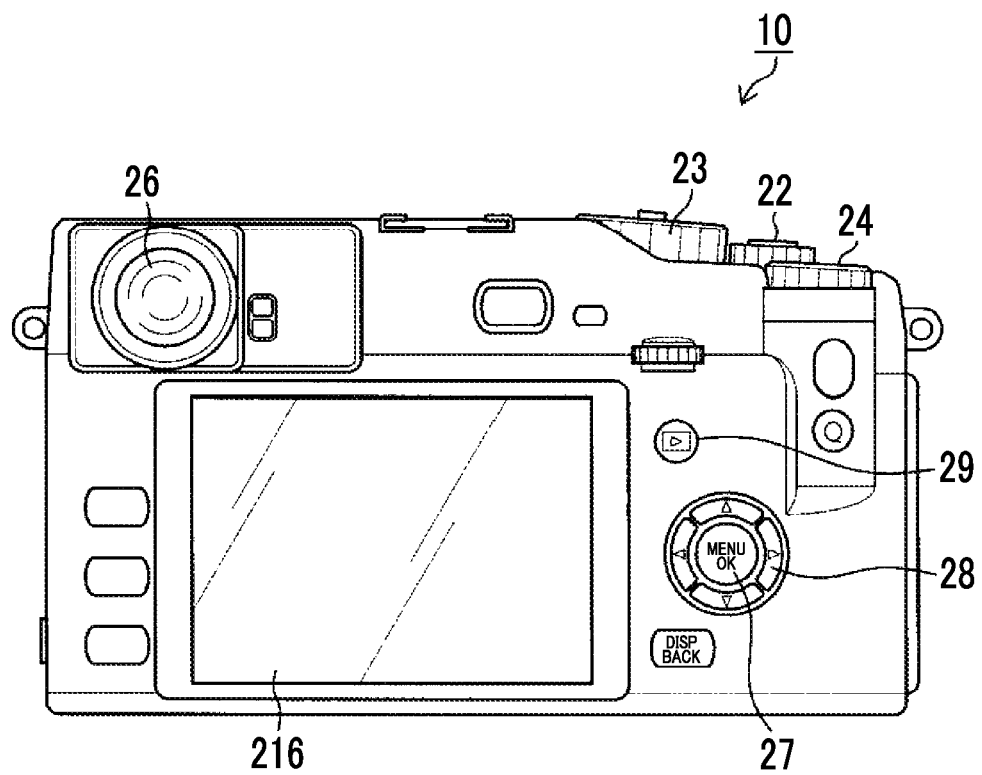
FIG. 2 is a rear view of the camera system according to the embodiment of the present invention.
Figure 3:
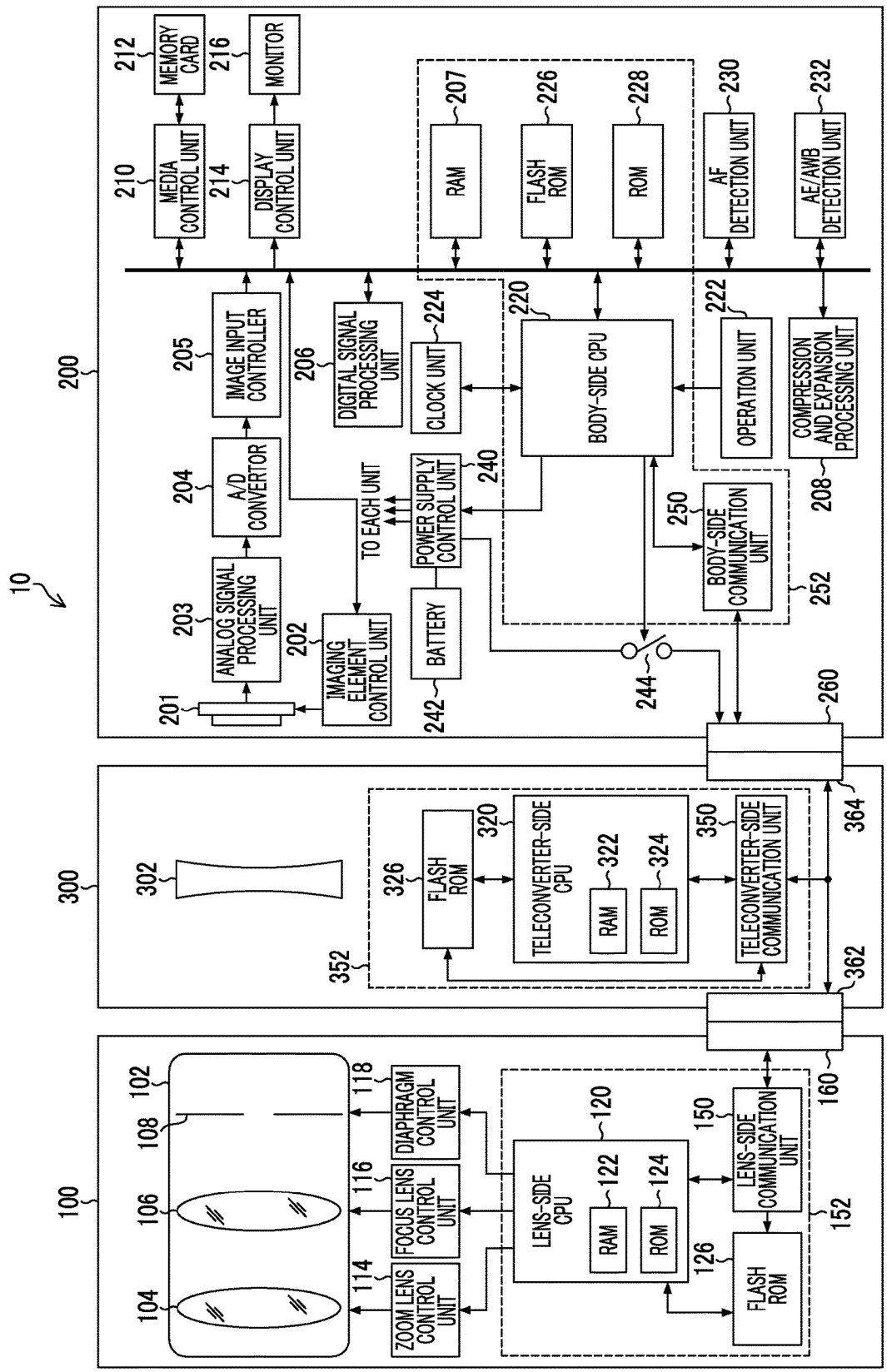
FIG. 3 is a block diagram illustrating a main configuration of the camera system according to the embodiment of the present invention.

FIGS. 1 and 2 are a perspective view and a rear view illustrating an appearance of a camera system (an imaging device 10) according to an embodiment of the present invention, and FIG. 3 is a block diagram illustrating a main configuration of the imaging device 10.

As illustrated in FIGS. 1, 2, and 3, an imaging device 10 includes an interchangeable lens 100, a camera body 200, and a teleconverter 300. The teleconverter 300 includes a distal end side mount 362 and a proximal end side mount (FIG. 3) 364. The interchangeable lens 100 includes a lens mount (a first mount) 160 (FIG. 3) detachably attached to the distal end side mount 362 of the teleconverter 300. The interchangeable lens 100 of this example has a cylindrical shape, and the lens mount 160 is formed at a proximal end of the interchangeable lens 100. The camera body 200 includes a body mount (a second mount) 260 to which the proximal end side mount 364 (FIG. 3) of the teleconverter 300 is detachably attached. The camera body 200 of this example has a box shape, and the body mount 260 is formed substantially at a center of a front face of the camera body 200. The lens mount 160 of the interchangeable lens 100 is mounted on the distal end side mount 362 of the teleconverter 300 and the proximal end side mount 364 of the teleconverter 300 is mounted on the body mount 260 of the camera body 200 so that the interchangeable lens 100 and the teleconverter 300 are detachably mounted on the camera body 200.

Note that although a case where the interchangeable lens 100 is mounted on the camera body 200 via the teleconverter 300 will be described in this embodiment, the interchangeable lens 100 can be directly mounted on the camera body 200.

Figure 4:
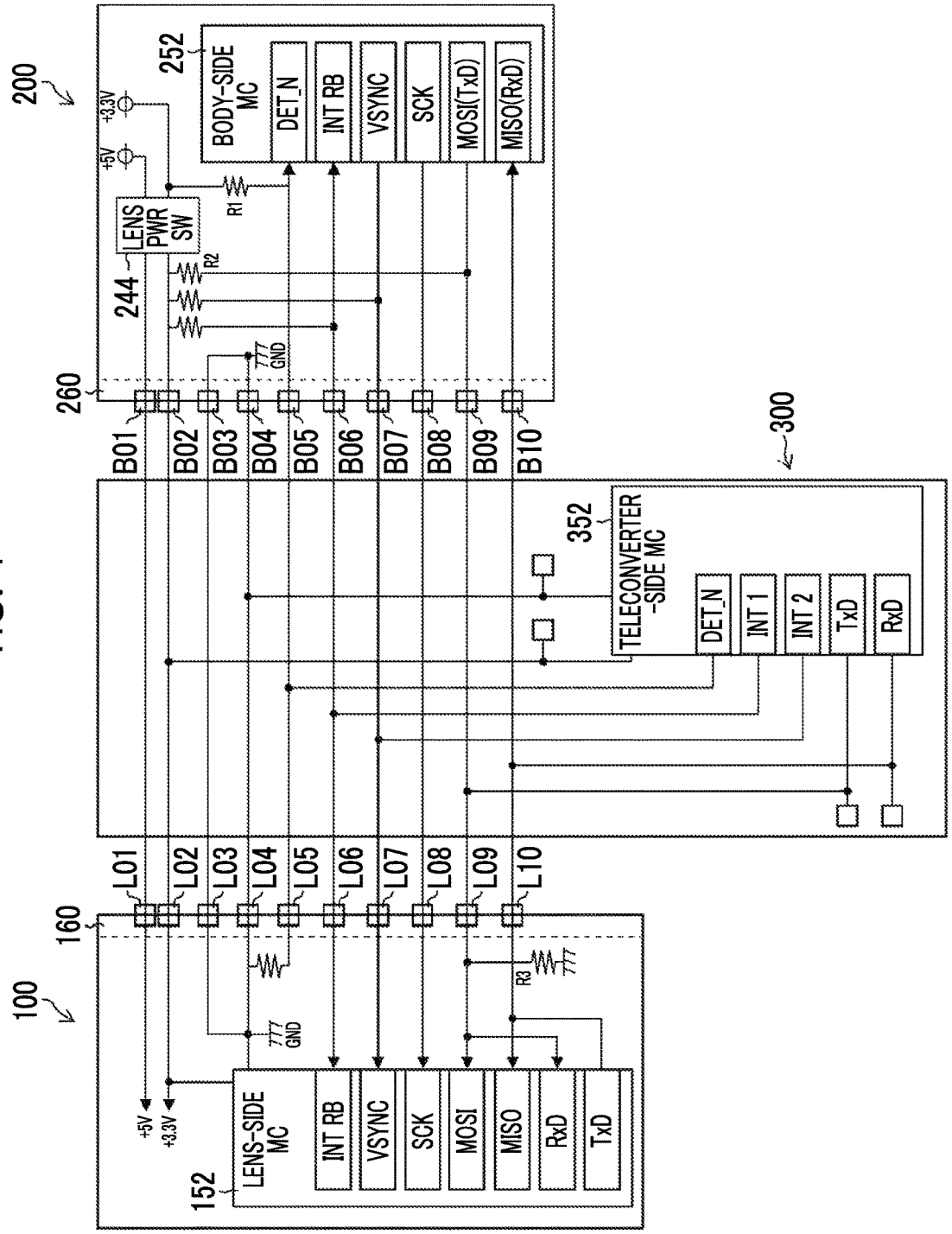
FIG. 4 is a diagram illustrating a configuration of a communication signal line in the camera system according to the embodiment of the present invention.

The lens mount 160, the body mount 260, the distal end side mount 362 and the proximal end side mount 364 of the teleconverter 300 are each provided with a plurality of terminals as contact points. In FIG. 1, a plurality of terminals 260*a* (body-side terminals) of the body mount 260 and a plurality of terminals 362*a* of the distal end side mount 362 are illustrated. In a case where the lens mount 160 is mounted on the distal end side mount 362 and the proximal end side mount 364 is mounted on the body mount 260, the mutual terminals of the lens mount 160, the body mount 260, the distal end side mount 362, and the proximal end side mount 364 are brought into contact with each other for conduction (FIGS. 3 and 4). In this example, the plurality of terminals are provided in each of the body mount 260, the lens mount 160, the distal end side mount 362, and the proximal end side mount 364 along a circumferential direction of the interchangeable lens 100.

An optical finder window 20 is mainly provided on the front face of the camera body 200. A shutter release button 22, a shutter speed dial 23, and an exposure correction dial 24 are mainly provided on a top surface of the camera body 200.

The shutter release button 22 is operation means for inputting an instruction to start imaging, and is configured as a two-step stroke type switch including so-called "half press" and "full press". In the imaging device 10, in a case where an S1 ON signal is output by half-pressing the shutter release button 22 (an operation of pressing the shutter release button 22 until the middle of a stroke), and an S2 ON signal is output by further fully pressing the shutter release button 22 (a full stroke pressing operation) from the half-press. In a case where the S1 ON signal is output, an imaging preparation process such as automatic focusing (AF process) and automatic exposure control (AE process) is executed, and in a case where the S2 ON signal is output, an imaging process is executed. Further, in the case of a video imaging mode, in a case where the shutter release button 22 is full-pressed, a video recording mode starts.

Note that the shutter release button 22 is not limited to the form of the 2-step stroke type switch including half press and full press, but the S1 ON signal and the S2 ON signal may be output through one operation, or individual switches may be provided to output the S1 ON signal or the S2 ON signal. Further, in a form in which an operation instruction is performed by a touch panel or a like, the operation means may output an operation instruction by an area corresponding to the operation instruction displayed on a screen of the touch panel being touched. In the present invention, a form of the operation means is not limited thereto as long as the operation means instructs the imaging preparation process or the imaging process. Further, the imaging preparation process and the imaging process may be continuously executed through an operation instruction in one operation means.

A user performs adjustment of a shutter speed using the shutter speed dial 23 and performs correction of exposure using the exposure correction dial 24.

FIG. 2 is a rear view of the imaging device 10. A monitor 216, an eyepiece portion 26 of an optical viewfinder, a MENU/OK key 27, a cross key 28, a playback button 29, and the like are mainly provided on a back surface of the camera body 200, as illustrated in FIG. 2.

The 1 monitor 216 displays a live view image, displays a captured image in a case where the playback button 29 is pressed, or displays a captured video. Further, the monitor 216 appropriately displays a message for requesting the user to input instructions or make a confirmation at the time of data acquisition or updating of the interchangeable lens 100 or the teleconverter 300.

Further, the user can perform various settings of the imaging device 10 using the MENU/OK key 27 and the cross key 28. For example, the user can perform switching between a still image capturing mode and a video imaging mode, and setting of whether or not specific image processing (a resolution enhancement process such as a point image restoration process) is executed, or data acquisition or updating of the interchangeable lens 100 or the teleconverter 300 using the MENU/OK key 27 and the cross key 28. The MENU/OK key 27 and the cross key 28 function as a selection reception unit.

FIG. 3 is a block diagram illustrating an overall configuration of the imaging device 10.

<Configuration of Interchangeable Lens>

The interchangeable lens 100 includes a imaging optical system 102 (a zoom lens 104, a focus lens 106, and a diaphragm 108), a zoom lens control unit 114, a focus lens control unit 116, a diaphragm control unit 118, a lens-side CPU 120, a flash ROM 126, a lens-side communication unit 150, and a lens mount 160. The lens-side microcomputer (MC) 152 includes a lens-side CPU 120, a flash ROM 126, and a lens-side communication unit 150.

The imaging optical system 102 includes the zoom lens 104, the focus lens 106, and the diaphragm 108. The zoom lens control unit 114 controls a position of the zoom lens 104 according to a command from the lens-side CPU 120. The focus lens control unit 116 controls a position of the focus lens 106 according to a command from the lens-side CPU 120. The diaphragm control unit 118 controls a diaphragm area of the diaphragm 108 according to a command from the lens-side CPU 120.

The lens-side CPU 120 is a central processing unit (CPU) of the interchangeable lens 100, and includes a read only memory (ROM) 124 and a random access memory (RAM) 122 built thereinto.

The flash ROM 126 is a nonvolatile memory that stores firmware or lens data of the interchangeable lens 100 downloaded from the camera body 200 or acquired via a recording medium or a network, a serial number (individual identification information) of the interchangeable lens 100, and the like.

The lens-side CPU 120 controls each unit of the interchangeable lens 100 using the RAM 122 as a work area according to a control program (firmware) stored in the ROM 124 or the flash ROM 126. With this control program, a serial number unique to the combination of the interchangeable lens 100 and the teleconverter 300 or lens data related to the combination is generated, as will be described in detail below.

The lens-side communication unit 150 performs communication with the camera body 200 and the teleconverter 300 via a plurality of signal terminals provided on the lens mount 160 in a state in which the interchangeable lens 100 is mounted on the camera body 200 via the teleconverter 300.

<Configuration of Camera Body>

The camera body 200 includes an imaging element (CMOS type or CCD type) 201, an imaging element control unit 202, an analog signal processing unit 203, an analog/digital (A/D) converter 204, an image input controller 205, a digital signal processing unit 206, a RAM 207, a compression and expansion processing unit 208, a media control unit 210, a memory card 212, a display control unit 214, a monitor 216, a body-side CPU (a body-side control unit) 220, an operation unit 222, a clock unit 224, a flash ROM 226, a ROM 228, an automatic focus (AF) detection unit 230, an automatic exposure/automatic white balance (AE/AWB) detection unit 232, a power supply control unit 240, a battery 242, a body-side communication unit 250, and a body mount 260. A body-side microcomputer (MC) 252 includes the body-side CPU 220, the RAM 207, the ROM 228, the flash ROM 226, and the body-side communication unit 250. Note that although the imaging element 201 is installed in the camera body 200 in FIG. 3, the present invention is not limited thereto. The imaging element 201 may be installed, for example, inside the interchangeable lens 100.

The imaging element 201 includes an image sensor that images a subject. An optical image of the subject formed on a light reception surface of the imaging element 201 by the imaging optical system 102 of the interchangeable lens 100 is converted into an electric signal by the imaging element 201. Examples of the imaging element 201 include a complementary metal oxide semiconductor (CMOS) type image sensor, and a charge coupled device (CCD) type image sensor.

The imaging element control unit 202 controls imaging timing, exposure time, or the like of the imaging element 201 according to a command of the body-side CPU 220.

The analog signal processing unit 203 performs various types of analog signal processing on an analog image signal obtained by the imaging element 201 imaging the subject. The analog signal processing unit 203 of this example includes, for example, a sample and hold circuit, a color separation circuit, and a gain adjustment circuit.

The A/D converter 204 converts an analog image signal output from the analog signal processing unit 203 into a digital image signal.

The image input controller 205 temporarily stores the digital image signal output from the A/D converter 204 in the RAM 207 as image data. In a case in which the imaging element 201 is a CMOS-type image sensor, the A/D converter 204 is often built in the imaging element 201. Note that the analog signal processing unit 203, the A/D converter 204, and the image input controller 205 constitute an analog front end (AFE).

The digital signal processing unit 206 performs various types of digital signal processing on the image data stored in the RAM 207. The digital signal processing unit 206 in this example includes, for example, a brightness and color difference signal generation circuit, a gamma correction circuit, a sharpness correction circuit, a contrast correction circuit, a white balance correction circuit, and a resolution enhancement processing circuit (a point image restoration process circuit).

The compression and expansion processing unit 208 performs a compression process on uncompressed image data stored in the RAM 207. Further, the compression and expansion processing unit 208 performs a expansion process on the compressed image data.

The media control unit 210 performs control to record the image data compressed by the compression and expansion processing unit 208 in the memory card 212. Further, the media control unit 210 performs control to read the compressed image data from the memory card 212. Note that the media control unit 210 also functions as an external input unit to which lens data for a teleconverter, difference data, and lens data for version-up to be described below are input.

The display control unit 214 performs control to display the uncompressed image data stored in the RAM 207 on the monitor 216. For the monitor 216, a liquid crystal monitor or an organic electronic luminescence (EL) monitor may be adopted.

In a case in which a live view image is displayed on the monitor 216, a digital image signal continuously generated by the digital signal processing unit 206 is temporarily stored in the RAM 207. The display control unit 214 converts the digital image signal temporarily stored in this RAM 207 to have a signal format for a display, and sequentially outputs the resultant signal to the monitor 216. Accordingly, the captured image is displayed on the monitor 216 in real time, such that imaging can be performed using the monitor 216 as an electronic viewfinder.

In a case in which imaging of the subject and recording of the image of the subject are performed, AE control and AF control are performed under the control of the body-side CPU 220 by half press of the shutter release button 22, and imaging is performed by full press. An image acquired by imaging is compressed in a predetermined compression format (for example, a Joint Photographic Experts Group (JPEG) format in the case of a still image or H264 in the case of a video) by the compression and expansion processing unit 208. The compressed image data is converted into an image file to which necessary ancillary information such as imaging date and time or imaging conditions is added, and then, the image file is stored in the memory card 212 via the media control unit 210.

The body-side CPU 220 collectively controls an entire operation of the imaging device 10. Further, the body-side CPU 220 constitutes a mounting determination unit that determines whether or not the interchangeable lens 100 and the teleconverter 300 have been mounted on the body mount 260. Note that the body-side CPU 220 also functions as camera data communication control for controlling communication of data with the interchangeable lens 100.

The operation unit 222 includes the shutter release button 22, the shutter speed dial 23, and the exposure correction dial 24 illustrated in FIG. 1, and the MENU/OK key 27, the cross key 28, and the playback button 29 illustrated in FIG. 2. The body-side CPU 220 controls each unit of the imaging device 10 based on an input from the operation unit 222 or the like.

The clock unit 224 is a timer and measures time on the basis of a command from the body-side CPU 220. Further, the clock unit 224 is a calendar and measures current date and time.

The flash ROM 226 is a readable and writable nonvolatile memory, and stores various types of setting information or lens data, individual identification information of the interchangeable lens 100 and the teleconverter 300, and the like.

Various data necessary for a control program or control executed by the body-side CPU 220 is recorded in the ROM 228. The body-side CPU 220 controls each unit of the imaging device 10 according to the control program stored in the ROM 228 using the RAM 207 as a work area.

The AF detection unit 230 calculates a numerical value necessary for autofocus (AF) control on the basis of the digital image signal. In the case of so-called contrast AF, for example, an integration value (focus evaluation value) of a high frequency component of a signal of a G (green) pixel in a predetermined AF area is calculated. The body-side CPU 220 moves the focus lens 106 to a position at which the focus evaluation value is maximized. AF is not limited to the contrast AF. For example, phase difference AF may be performed.

The AE/AWB detection unit 232 calculates a numerical value necessary for automatic exposure (AE) control and automatic white balance (AWB) control on the basis of the digital image signal. The body-side CPU 220 calculates brightness of the subject (subject luminance) on the basis of the numerical value obtained from the AE/AWB detection unit 232, and determines the diaphragm information (F-number) and the shutter speed from a predetermined program diagram.

The power supply control unit 240 applies a power supply voltage supplied from the battery 242 to each unit of the camera body 200 according to a command of the body-side CPU 220. Further, the power supply control unit 240 applies the power supply voltage supplied from the battery 242 to each unit of the interchangeable lens 100 and the teleconverter 300 via the body mount 260, the lens mount 160, and the distal end side mount 362 and the proximal end side mount 364 of the teleconverter 300 according to a command of the body-side CPU 220.

A lens power switch 244 performs switching between ON and OFF and switching between levels of the power supply voltage applied to the interchangeable lens 100 and the teleconverter 300 via the body mount 260, the lens mount 160, the distal end side mount 362, and the proximal end side mount 364 according to a command of the body-side CPU 220.

The body-side communication unit 250 performs signal transmission and reception (communication) to and from the lens-side communication unit 150 of the interchangeable lens 100 according to a command of the body-side CPU 220. Meanwhile, the lens-side communication unit 150 performs signal transmission and reception (communication) to and from the body-side communication unit 250 of the camera body 200 and the teleconverter-side communication unit 350 of the teleconverter 300 according to a command of the lens-side CPU 120.

<Configuration of Teleconverter>

The teleconverter 300 includes a teleconversion lens 302, a teleconverter-side CPU (an accessory control unit) 320, a flash ROM 326, a teleconverter-side communication unit 350, the distal end side mount 362, and the proximal end side mount 364. The teleconverter-side microcomputer (MC) 352 includes the teleconverter-side CPU 320, the flash ROM 326, and the teleconverter-side communication unit 350.

The teleconversion lens 302 is a lens (or a lens group) for making a focal length longer than a focal length of the interchangeable lens 100 alone in a state in which the interchangeable lens 100 and the teleconverter 300 are mounted. A rate of change in the focal length may have a value of 1.4 times, 2 times or the like.

The teleconverter-side CPU 320 is a central processing unit (CPU) of the teleconverter 300, and includes a RAM 322 and a ROM 324.

The flash ROM 326 is a nonvolatile memory that stores firmware of the teleconverter 300, data of optical characteristics (for example, a magnification of a focal length or a degree of change in a diaphragm 108), and the like.

The teleconverter-side CPU 320 controls the teleconverter-side communication unit 350 using the RAM 322 as a work area according to the control program (firmware) stored in the ROM 324 or the flash ROM 326.

In a state in which the interchangeable lens 100 is mounted on the camera body 200 via the teleconverter 300, the teleconverter-side communication unit 350 performs communication with the interchangeable lens 100 via the plurality of signal terminals provided in the lens mount 160 and the distal end side mount 362. Note that in the embodiment, the teleconverter 300 does not directly communicate with the camera body 200, and the interchangeable lens 100 that has received the request command from the camera body 200 performs transmission and reception to and from the teleconverter 300.

<Communication Via Terminals>

FIG. 4 is an illustrative diagram illustrating the body mount 260 and the lens mount 160, peripheral portions thereof, and relevant portions in the teleconverter 300. In a state in which the interchangeable lens 100 is mounted on the camera body 200 via the teleconverter 300, the plurality of terminals 260a (ten terminals denoted by reference numerals "B01" to "B10" in FIG. 4 in this example) of the body mount 260 are brought into contact with the plurality of terminals of the proximal end side mount 364 of the teleconverter 300, respectively, and the plurality of terminals (ten terminals "L01" to "L10" in FIG. 4 in this example) of the lens mount 160 are brought into contact with the plurality of terminals (a plurality of fourth terminals) 362a (FIG. 1) of the distal end side mount 362 of the teleconverter 300, respectively. Note that illustration of a plurality of terminals of the proximal end side mount 364 of the teleconverter 300 is omitted.

<Communication Between Camera Body and Interchangeable Lens>

In the above configuration, communication between the camera body 200 and the interchangeable lens 100 will be described below. In the communication between the camera body 200 and the interchangeable lens 100, signals are transmitted and received via the plurality of terminals provided on the distal end side mount 362 and the proximal end side mount 364 of the teleconverter 300, but since the teleconverter-side CPU 320 or the teleconverter-side communication unit 350 is not involved in control of the transmission and reception between the camera body 200 and the interchangeable lens 100, description of the teleconverter 300 and the terminals thereof will be appropriately omitted hereinafter. Note that in the following description, the signal terminals are appropriately referred to as "terminals". For example, an INTR_BUSY signal terminal to be described below may be referred to as an "INTR_BUSY terminal".

A first terminal B01 (a +5 V terminal) of the body mount 260 is a first body-side power supply terminal for giving a +5 V voltage of the battery 242 from the camera body 200 to the interchangeable lens 100, and is connected to the power supply control unit 240 and the battery 242 via the lens power switch 244.

A second terminal B02 (a +3.3 V terminal) of the body mount 260 is a second body-side power supply terminal for giving a +3.3 V voltage of the battery 242 from the camera body 200 to the interchangeable lens 100.

A third terminal B03 (a ground (GND) terminal) and a fourth terminal B04 (a digital ground (DGND) terminal) of the body mount 260 are body-side ground terminals for giving a 0 V (ground voltage) from the camera body 200 to the interchangeable lens 100. The third terminal B03 and the fourth terminal B04 are connected to a ground of the camera body 200.

A fifth terminal B05 (a LENS_DET (Lens Detection) terminal) of the body mount 260 is a body-side terminal dedicated for detection of the interchangeable lens 100 and the teleconverter 300, as will be described in detail below.

A sixth terminal B06 to a tenth terminal B10 of the body mount 260 are a plurality of body-side signal terminals for signal transmission and reception to and from the interchangeable lens 100.

The sixth terminal B06 (an INTR_BUSY signal terminal) of the body mount 260 is a body-side busy signal terminal (an Inter Busy signal terminal) for notifying whether or not the interchangeable lens 100 or the camera body 200 is in a specific operation period.

The seventh terminal B07 (a VSYNC signal terminal) of the body mount 260 is a body-side signal terminal (a vertical synchronization signal terminal) for vertical synchronization between the camera body 200 and the interchangeable lens 100.

The eighth terminal B08 (an SCK signal terminal), the ninth terminal B09 (a MOSI signal terminal), and the tenth terminal B10 (a MISO signal terminal) of the body mount 260 are body-side communication signal terminals for serial communication between the camera body 200 and the interchangeable lens 100. The system clock (SCK) signal is a clock signal that is given from the camera body 200 serving as a master to the interchangeable lens 100 serving as a slave. The MOSI (Master Out/Slave In) signal is a signal that is output from the camera body 200 serving as a master and input to the interchangeable lens 100 serving as a slave. The MISO (Master In/Slave Out) signal is output from the interchangeable lens 100 serving as a slave and input to the camera body 200 serving as the master.

The fifth terminal B05 (LENS_DET (Lens Detection) terminal) of the body mount 260 is a body-side terminal dedicated for detection of the interchangeable lens 100 and the teleconverter 300. In this example, a high level (a high potential) indicates that the LENS_DET (Lens Detection) terminal of the body mount 260 and the LENS_DET terminal (the fifth terminal L05) of the lens mount 160 are in a non-contact state (a non-mounted state), and a low level (a low potential) indicates that the LENS_DET terminal of the body mount 260 and the LENS_DET terminal of the lens mount 160 are in a contact state (a mounted state) (via the distal end side mount 362 and the proximal end side mount 364 of the teleconverter 300).

The fifth terminal B05 (a LENS_DET terminal) of the body mount 260 is connected to the power supply control unit 240 and the battery 242 via a first pull-up resistor R1. Further, the ninth terminal B09 (a MOSI signal terminal) among the plurality of signal terminals (the sixth terminal B06 to the tenth terminal B10) for signal transmission and reception (communication) of the body mount 260 is connected to the battery 242 via a pull-up resistor R2 and the lens power switch 244.

The second pull-up resistor R2 is connected to the lens power switch 244. In a state in which the lens power switch 244 is turned off (the non-power supply voltage supply state of the interchangeable lens 100), the ninth terminal B09 (the MOSI signal terminal) is not pulled up. The ninth terminal B09 (the MOST signal terminal) is pulled up in a state in which the lens power switch 244 is turned on by the body-side CPU 220 (a power supply voltage supply state of the interchangeable lens 100). That is, the voltage of the ninth terminal L09 (the MOSI signal terminal) of the interchangeable lens 100 does not become at a high level only by turning on the power switch of the camera body 200, but in a case where the lens power switch 244 is turned on by the body-side CPU 220, the voltage of the ninth terminal L09 (the MOSI signal terminal) of the interchangeable lens 100 becomes at a high level. Accordingly, malfunction of the lens-side MC 152 on the interchangeable lens 100 side is prevented.

Figure 5:
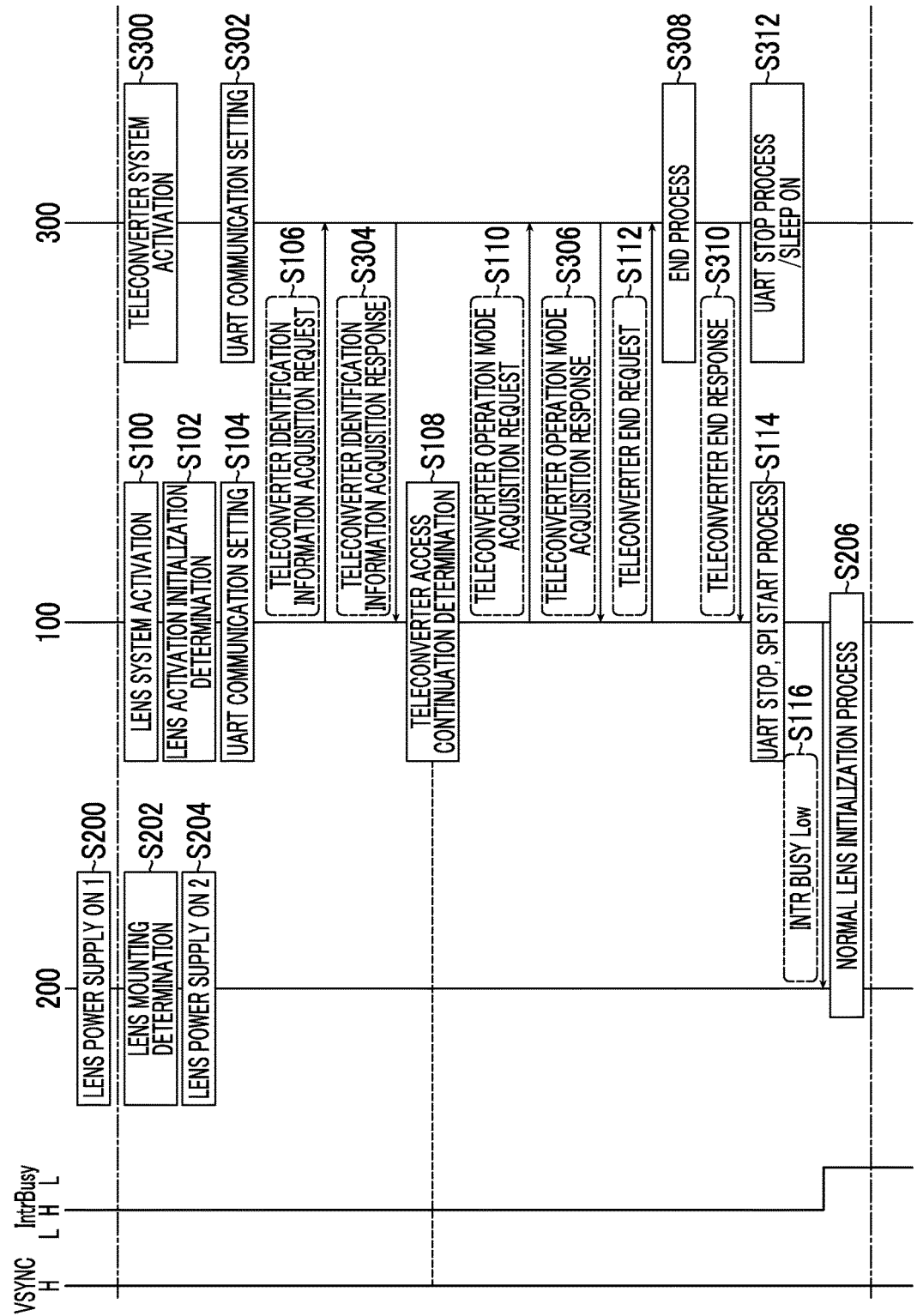
FIG. 5 is a diagram illustrating a normal activation sequence in the camera system according to the embodiment of the present invention.

The body-side CPU 220 of the camera body 200 sets only the fifth terminal B05 (the LENS_DET terminal) to a determination target and determines whether or not the fifth terminal B05 (the LENS_DET terminal) is at a low level before the pre-power is supplied to the interchangeable lens 100 and the teleconverter 300 via the body-side power supply terminal of the body mount 260 (step S200 in FIG. 5). In a case where the LENS_DET terminal is at a low level in this determination, the body-side CPU 220 of the camera body 200 determines whether or not both the LENS_DET terminal and the ninth terminal B09 (the MOSI signal terminal) at the time of non-communication are at the low level after the pre-power is supplied to the interchangeable lens 100 and the teleconverter 300 via the body-side power supply terminal of the body mount 260 (step S202 in FIG. 5).

The fifth terminal L05 (the LENS_DET terminal) of the lens mount 160 is connected to the ground (the GND terminal and the DGND terminal). Further, the ninth terminal L09 (the MOSI signal terminal) among the plurality of signal terminals (the sixth terminal L06 to the tenth terminal L10) of the lens mount 160 is connected to the ground via a pull-down resistor R3 that has a resistance value sufficiently smaller than the pull-up resistor R2.

As the mounting determination unit, the body-side CPU 220 determines whether or not the lens mount 160, and the distal end side mount 362 and the proximal end side mount 364 of the teleconverter 300 are mounted on the body mount 260 (that is, a determination as to whether or not the interchangeable lens 100 and the teleconverter 300 are mounted on the camera body 200) on the basis of a voltage (high level/low level) of the fifth terminal B05 (the LENS_DET terminal) of the body mount 260 and a voltage (high level/low level) of a specific body-side signal terminal (the MOSI signal terminal in this example) at the time of non-communication. Specifically, in a case where both the voltage of the fifth terminal B05 (the LENS_DET terminal) of the camera body 200 and the voltage of the ninth terminal B09 (the MOSI signal terminal) at the time of non-communication become at a low level, the body-side CPU 220 determines that the interchangeable lens 100 and the teleconverter 300 are mounted on the body mount 260 (step S202 in FIG. 5).

Further, the lens-side CPU 120 may determine whether or not the lens mount 160 is mounted on the body mount 260 (that is, determine whether or not the interchangeable lens 100 is mounted on the camera body 200) on the basis of the voltage of the fifth terminal L05 (the LENS_DET terminal) of the lens mount 160 and the voltage of the specific lens-side signal terminal (MOSI signal terminal in this example) at the time of non-communication. In this case, the lens-side CPU 120 determines that the interchangeable lens 100 and the teleconverter 300 are mounted on the body mount 260 in a case where both the voltage of the LENS_DET terminal and the voltage of the MT_MOSI signal terminal at the time of non-communication of the interchangeable lens 100 become at a low level.

Specifically, in a case where the body-side CPU 220 determines that the interchangeable lens 100 and the teleconverter 300 have been mounted on the body mount 260, the body-side CPU 220 supplies a main power supply voltage to the interchangeable lens 100 (step S204 in FIG. 5).

The body-side MC 252 includes a terminal for detecting a change (high level/low level) in a potential of the sixth terminal B06 (a INTR_BUSY signal terminal) of the body mount 260, a terminal for applying a synchronization signal to the seventh terminal B07 (a VSYNC signal terminal) of the body mount 260, an interface (SPI: Serial Peripheral Interface) for serial communication using the eighth terminal B08 to the tenth terminal B10 (hereinafter also referred to as "communication signal terminals") of the body mount 260, a terminal for detecting a change (high level/low level) in a potential of the fifth terminal B05 (the LENS_DET terminal) of the body mount 260, and a terminal for updating firmware of the interchangeable lens 100.

The lens-side MC 152 includes a terminal for detecting a change (high level/low level) in a potential of the sixth terminal L06 (INTR_BUSY signal terminal) of the lens mount 160, an interface (SPI) for serial communication using the eighth terminal L08 to the tenth terminal L10 (communication signal terminals) of the lens mount 160, and a terminal for updating the firmware of the interchangeable lens 100.

<Communication Between Interchangeable Lens and Teleconverters>

Next, communication between the interchangeable lens 100 and the teleconverter 300 will be described. The communication between the interchangeable lens 100 and the teleconverter 300 is performed using a two-line Universal Asynchronous Receiver Transmitter (UART) scheme in which the interchangeable lens 100 is a master and the teleconverter 300 is a slave.

In a state in which the interchangeable lens 100 is mounted on the camera body 200 via the teleconverter 300, the ten terminals 362a of the distal end side mount 362 of the teleconverter 300 are brought into contact with the first terminal L01 to the tenth terminal L10 of the interchangeable lens 100, respectively, and the ten terminals of the proximal end side mount 364 are brought into contact with the first terminal B01 to the tenth terminal B10 of the camera body 200, respectively. Communication signal lines between the interchangeable lens 100 and the teleconverter 300 are connected to communication signal lines of the interchangeable lens 100 via these terminals.

Specifically, signal lines for a pre-power supply signal and a main power supply voltage supply signal, a mounting detection signal (a LENS_DET signal) of the interchangeable lens 100 and the teleconverter 300, a general-purpose bidirectional interrupt signal (INTR_BUSY signal), a 2-line UART reception signal (a MOSI signal), a 2-line UART transmission signal (a MISO signal), and a rewrite mode selection signal (VSYNC) at the time of firmware updating of the teleconverter 300 are respectively connected to the communication signal lines between the interchangeable lens 100 and the camera body 200.

The LENS_DET signal is at a low level (a low potential) in a case where the interchangeable lens 100 and the teleconverter 300 are mounted on the camera body 200, and is at a high level (a high potential) in a case where the interchangeable lens 100 and the teleconverter 300 are not mounted. The MOSI signal is used in a case where the teleconverter 300 receives a signal from the interchangeable lens 100 and the MISO signal is used in a case where the teleconverter 300 transmits a signal to the interchangeable lens 100. The voltage levels of these signals are both +3.3 V.

Note that the teleconverter 300 does not directly communicate with the camera body 200, and the interchangeable lens 100 that has received a request command from the camera body 200 performs transmission and reception to and from the teleconverter 300.

<Normal Activation Sequence>

Next, a normal activation sequence in the imaging device 10 of the embodiment (in a case where a mode is not a mode in which the firmware of the teleconverter 300 is updated) will be described with reference to FIG. 5.

In a case where a power switch (not shown) provided in the operation unit 222 of the camera body 200 is turned on, the body-side CPU 220 determines whether or not the fifth terminal B05 (the LENS_DET terminal) of the body mount 260 is at a low level as described above, and then, supplies the pre-power to the interchangeable lens 100 and the teleconverter 300 (step S200). Note that in this case, the body-side CPU 220 sets the VSYNC signal to a high level, and the lens-side CPU 120 sets the INTR_BUSY signal to a high level. Note that the pre-power is supplied in a case where the VSYNC signal is at a high level, but since a setting of the terminals of the camera body 200 to be described below is not performed at this point, signals from the interchangeable lens 100 and the teleconverter 300 are not recognized as signals (invalidated).

In a case where the LENS_DET terminal is at a low level in the above determination, the body-side CPU 220 detects the signal levels of the LENS_DET terminal and the MOSI signal terminal at the time of non-communication after the pre-power is supplied in step S200, determines that the interchangeable lens 100 and the teleconverter 300 have been mounted on the body mount 260 in a case where both signals become at the low level (step S202), and supplies main power supply voltage (step S204).

In a case where the pre-power is supplied in step S200, the lens-side CPU 120 of the interchangeable lens 100 activates the lens system (step S100), determines initialization of the lens activation (step S102), and performs a UART communication setting (step S104). On the other hand, in a case where the pre-power is supplied, the teleconverter-side CPU 320 of the teleconverter 300 activates the system of the teleconverter 300 (step S300) and sets the UART communication setting (step S302).

In a case where the processes in steps S104 and S302 end, the lens-side CPU 120 requests the teleconverter 300 to provide teleconverter identification information (including a serial number as the individual identification information of the teleconverter 300 and optical characteristic data of the teleconverter 300) (step S106). The optical characteristic data includes a focal length scaling ratio, but the present invention is not limited thereto and may include data such as a rate of change in a diaphragm value (F-number). In a case where the lens-side CPU 120 receives the teleconverter identification information from the teleconverter 300 before timeout (step S304), the lens-side CPU 120 then generates (acquires) combination identification information (combination serial number) that is information unique to the combination of the interchangeable lens 100 and the teleconverter 300, and lens data related to the combination of the interchangeable lens 100 and the teleconverter 300.

In a case where the lens-side CPU 120 of the interchangeable lens 100 receives the teleconverter identification information in step S304, the lens-side CPU 120 of the interchangeable lens 100 performs a determination (a teleconverter access continuation determination) as to whether or not to continue access to the teleconverter 300 (a communicatable state) according to an output signal level of the VSYNC terminal (step S108). In the teleconverter access continuation determination, in a case where the VSYNC terminal is at the low level, the lens-side CPU 120 of the interchangeable lens 100 determines to continue the teleconverter access. In a case where the VSYNC terminal is at the high level, the lens-side CPU 120 of the interchangeable lens 100 determines to stop the teleconverter access. In the normal activation sequence illustrated in FIG. 5 (in a case where the firmware updating of the teleconverter 300 is not performed), since the VSYNC signal is set to the high level, the lens-side CPU 120 of the interchangeable lens 100 determines not to continue the teleconverter access.

Then, the interchangeable lens 100 transmits a teleconverter operation mode acquisition request to the teleconverter 300 (step S110), and the teleconverter 300 returns a response to the teleconverter operation mode acquisition request (step S306). Here, the teleconverter operation mode includes, for example, a normal operation mode, a firmware update mode (FWUP date mode: also referred to as a teleconverter operation mode), and a standby mode. Commands that can be transmitted are limited for each operation mode. For example, in the normal operation mode, a teleconverter end command is received, whereas in the FWUP date mode, the teleconverter end command is not received. Further, the standby mode is an operation mode in which all commands are not received.

The activation sequence illustrated in FIG. 5 is the normal operation mode in which the firmware update of the teleconverter 300 is not performed, and the lens-side CPU 120 transmits a teleconverter end request (teleconverter end command) to the teleconverter 300 (step S112). In a case where the teleconverter-side CPU 320 receives the teleconverter end request, the teleconverter-side CPU 320 performs a process of ending a teleconverter system to set the teleconverter 300 to the standby mode (step S308), returns a teleconverter end response to the interchangeable lens 100 (step S310), and performs a process of stopping the UART communication to enter sleep state (step S312).

In a case where the lens-side CPU 120 receives the teleconverter end response, the lens-side CPU 120 performs a process of stopping the UART communication and a process of starting SPI communication (step S114), and sets the INTR_BUSY signal to a low level (step S116: lens initialization completion notification interrupt signal). This signal is received, and a normal lens initialization process (a communication terminal setting of the camera body 200 and an initial position drive of the interchangeable lens 100, lens data (lens data for a teleconverter) acquisition request and response according to the combination of the interchangeable lens 100 and the teleconverter 300, or the like) is performed between the camera body 200 and the interchangeable lens 100 (step S206).

Figure 6:
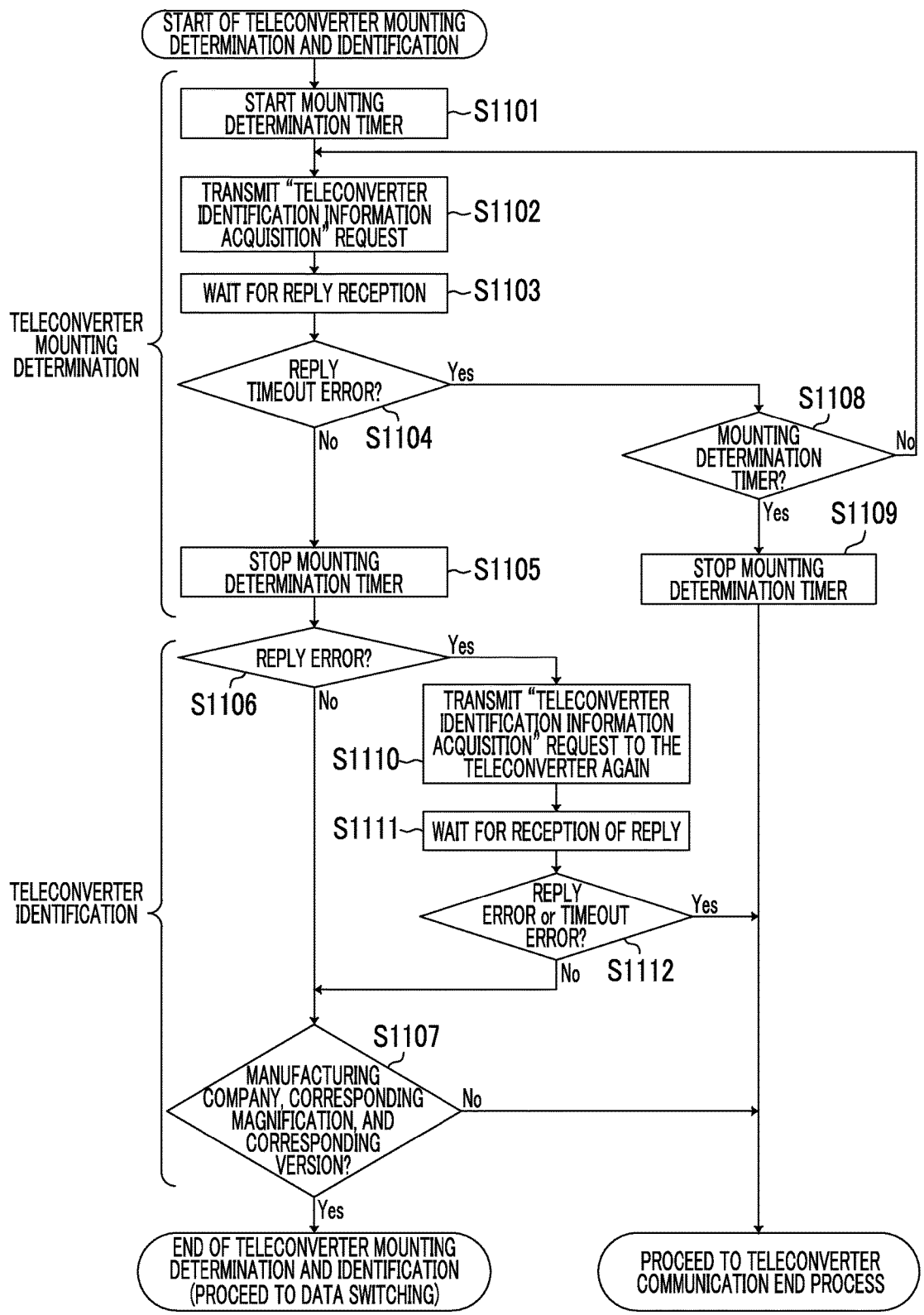
FIG. 6 is a flow diagram illustrating a teleconverter mounting determination and identification of a teleconverter.

FIG. 6 is a flow diagram illustrating a mounting determination of the teleconverter 300 performed by the lens-side CPU 120 and identification of the teleconverter 300.

First, the mounting determination of the teleconverter 300 is performed. The lens-side CPU 120 starts a mounting determination timer provided in the lens-side CPU 120 (step S1101). The lens-side CPU 120 transmits a teleconverter identification information acquisition request to the teleconverter 300 (step S1102). Transmission of the teleconverter identification information acquisition request has been described in step S106 in FIG. 5. Thereafter, the lens-side CPU 120 waits for a reply from the teleconverter 300 (step S1103), and the lens-side CPU 120 performs a determination of a reply timeout error on the basis of the mounting determination timer (step S1104). In a case where reception of a reply command from the teleconverter 300 is not started within a predetermined time after the teleconverter identification information acquisition request is transmitted to the teleconverter 300 (Yes in step S1104), the lens-side CPU 120 determines a timeout error. Thereafter, the lens-side CPU 120 performs a determination of mounting determination timeout (step S1108). Note that, here, the reply time is a time for which the lens-side CPU 120 is waiting for a reply after transmitting a teleconverter identification information acquisition request, and the mounting determination time is a time required for a mounting determination. According to the setting of the mounting determination time, the lens-side CPU 120 can repeat the teleconverter identification information acquisition request and the waiting a plurality of times.

Therefore, in a case where the lens-side CPU 120 determines the mounting determination time on the basis of the mounting determination timer to determine the mounting determination timeout (Yes in step S1108), the lens-side CPU 120 stops the mounting determination timer (step S1109) and proceeds to a process of ending communication of the teleconverter 300.

Further, in a case where the lens-side CPU 120 receives a response command (a teleconverter identification information acquisition response) from the teleconverter 300 within a predetermined time after transmitting the teleconverter identification information acquisition request to the teleconverter 300 (No in step S1104), the lens-side CPU 120 determines non-timeout error (No in step S1104), and stops the mounting determination timer (step S1105).

As described above, the lens-side CPU 120 determines whether or not the teleconverter 300 is mounted according to whether or not a reply to the teleconverter identification information acquisition request can be received from the teleconverter 300 during the reply time.

Next, identification (specifying) of the teleconverter 300 is performed. In a case where the lens-side CPU 120 determines that the teleconverter 300 is mounted after sending the teleconverter identification information acquisition request to the teleconverter 300, that is, in a case where the reply is received from the teleconverter 300 within a predetermined time (No in step S1104), the mounting timer is stopped (step S1105), and the identification of the teleconverter 300 is performed.

The lens-side CPU 120 determines whether or not the acquired reply is an error reply (step S1106). In a case where the reply is an error reply (Yes in step S1106), the lens-side CPU 120 transmits the teleconverter identification information acquisition request to the teleconverter 300 again (step S1110), and waits for reception of the reply from the teleconverter 300 (step S1111). Thereafter, the lens-side CPU 120 performs the timeout error determination (steps S1104 and S1108) and the reply error determination (step S1106) described above (step S1112), and in a case where an error is determined (Yes in step S1112), the process proceeds to a teleconverter communication end process. Note that, here, the reply error is an error reply transmitted from the teleconverter 300, and in a case where there is an error in the command received from the interchangeable lens 100 or in a case where an error has occurred when a process according to the command is performed, the teleconverter 300 transmits the error reply.

On the other hand, in a case where the acquired reply is not an error reply (No in step S1106), the lens-side CPU 120 collates the acquired reply (the teleconverter identification information) with the stored lens data for a teleconverter in terms of a manufacturing company, a corresponding magnification, and a corresponding version. In a case where the data match in all items (Yes in step S1107), the teleconverter mounting determination and the identification (specifying) are completed, and the process proceeds to switching of the lens data to be transferred to the camera body 200. That is, when there is a request for lens data from the camera body 200, the lens-side CPU 120 (the lens control unit 123) transfers the lens data (third lens data) for the teleconverter optimized according to optical characteristics of the teleconverter 300 of the interchangeable lens 100 to the camera body 200 according to the identification information of the teleconverter 300 acquired as described above.

Meanwhile, the lens-side CPU 120 collates the acquired reply (the teleconverter identification information) with the stored lens data for a teleconverter in terms of the manufacturing company, the corresponding magnification, and the corresponding version, and proceeds to the process of ending communication of the teleconverter 300 in a case where there is any one item that does not match (No in step S1107). In a case where the identification information has not been acquired or in a case where the lens data for a teleconverter corresponding to the identification information is not included, the lens-side CPU 120 (the lens control unit 123) transfers the original lens data of the interchangeable lens 100 to the camera body 200.

Figure 7:
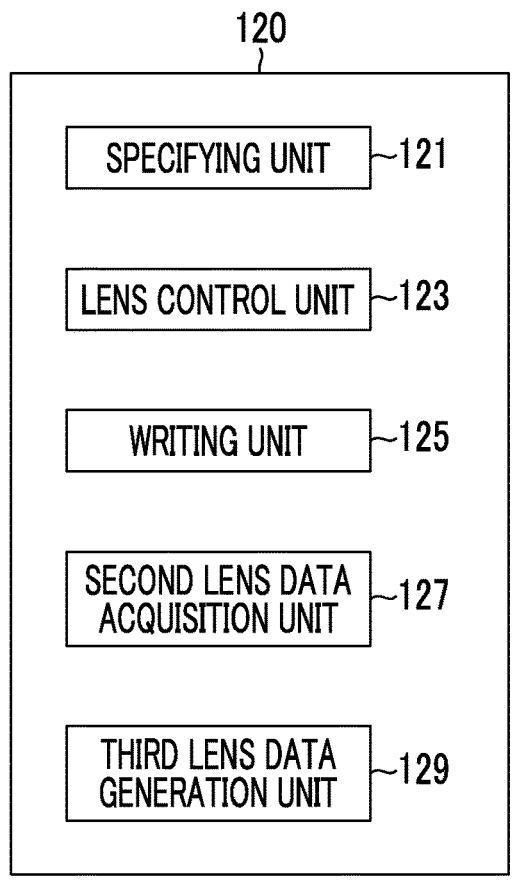
FIG. 7 is a block diagram of a function realized in a lens-side CPU.

FIG. 7 is a block diagram of functions realized by the lens-side CPU 120. The lens-side CPU 120 realizes the functions of the specifying unit 121, the lens control unit 123, the writing unit 125, the second lens data acquisition unit 127, and the third lens data generation unit 129 using the RAM 122, the ROM 124, or the flash ROM 126.

The specifying unit 121 determines whether or not the accessory is mounted on the first mount, and, acquires the identification information from the accessory to specify the mounted accessory in a case where it is determined that the accessory is mounted. That is, the specifying unit 121 mainly performs a mounting determination of the teleconverter 300 and identification (specifying) of the teleconverter 300 described with reference to FIG. 6.

In a case where there is a lens data acquisition request from the camera body 200, the lens control unit 123 transfers the original lens data or the lens data for a teleconverter stored in the flash ROM 126 to the camera body 200 on the basis of the result output by the specifying unit 121. That is, as described with reference to FIG. 5, the lens control unit 123 transfers the original lens data or the lens data for a teleconverter to the camera body 200 in the normal lens initialization process (step S206 in FIG. 5). Further, the lens control unit 123 transfers the original lens data stored in the flash ROM 126 to the camera body 200 in a case where the specifying unit 121 determines that the teleconverter 300 is not mounted on the lens mount 160 as described with reference to FIG. 6, and transfers the lens data for a teleconverter to the camera body 200 in a case where the specifying unit 121 determines that the teleconverter 300 is mounted on the lens mount 160 and the differential data corresponding to the teleconverter 300 specified by the specifying unit 121 is stored in the flash ROM 126.

The writing unit 125 writes the differential data acquired by the second lens data acquisition unit 127 in the second storage area of the flash ROM 126. That is, the writing unit 125 writes new differential data to the flash ROM 126. The writing unit 125 overwrites the second lens data stored in the flash ROM 126 with the second lens data acquired by the second lens data acquisition unit 127 according to a capacity in which storage is allowed in the flash ROM 126. That is, in a case where the writing unit 125 determines that the storage capacity of the differential data to be newly written to the flash ROM 126 is insufficient, the writing unit 125 writes new differential data to the flash ROM 126 by overwriting differential data already stored. Further, in a case where it is determined that the second lens data to be written to the flash ROM 126 is version-up of the second lens data already stored in the flash ROM 126, the writing unit 125 overwrites the second lens data stored in the flash ROM 126 with the second lens data acquired by the second lens data acquisition unit 127. That is, for version-up of the differential data already stored, the writing unit 125 overwrites the differential data to thereby write the differential data subjected to version-up to the flash ROM 126.

The second lens data acquisition unit 127 may acquire the second lens data from the camera body 200. Specifically, the second lens data acquisition unit 127 acquires differential data to be stored in the flash ROM 126 of the interchangeable lens 100 from the camera body 200.

The third lens data generation unit 129 generates third lens data that is lens data obtained by correcting the first lens data on the basis of the optical characteristics of the accessory using the second lens data as the differential data and the first lens data. That is, the third lens data generation unit 129 generates lens data for a teleconverter on the basis of the original lens data and the differential data stored in the flash ROM 126. Note that the generation of lens data for a teleconverter will be described below in detail.

Although the functions realized by the lens-side CPU 120 illustrated in FIG. 7 have been described above, the functions of the lens-side CPU 120 are not limited to those described above. For example, the second lens data generation unit may be realized by the lens-side CPU 120. The second lens data generation unit calculates differential data on the basis of, for example, data related to differential data acquired from the camera body 200. In a case where the second lens data generation unit generates the differential data, the second lens data acquisition unit 127 acquires the differential data generated by the second lens data generation unit.

Figure 8:
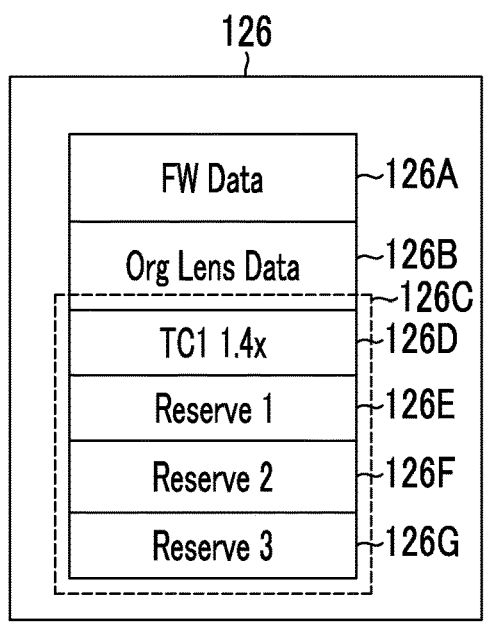
FIG. 8 is a diagram illustrating an example of a data configuration of a storage unit.

FIG. 8 is a diagram illustrating an example of a data configuration of the flash ROM 126 of the interchangeable lens 100.

The flash ROM 126 includes a firmware data storage area 126A, an original lens data storage area (a first storage area) 126B, and a teleconverter lens data storage area (a second storage area) 126C. Further, the teleconverter lens data storage area 126C includes areas (126D to 126G) for storing the lens data for a teleconverter.

The firmware data storage area 126A is an area for storing firmware data. The firmware data stored in the firmware data storage area 126A is data for operating the interchangeable lens 100.

The original lens data storage area 126B stores original lens data (first lens data) which is lens data in a case where an accessory is not mounted. Although not particularly limited, the original lens data is stored in the original lens data storage area 126B at the time of shipment of the interchangeable lens 100.

The teleconverter lens data storage area (second storage area) 126C stores differential data between the lens data in a case where the accessory is mounted, which is lens data (lens data for a teleconverter) obtained by correcting the original lens data on the basis of the optical characteristics of the accessory, and the original lens data. By storing the data in the format of differential data as lens data for a teleconverter as described above, it is possible to efficiently use the storage capacity of the teleconverter lens data storage area 126C.

Note that the teleconverter lens data storage area 126C stores one or a plurality of pieces of differential data. In the case illustrated in FIG. 8, the lens data for a teleconverter corresponding to TC1 1.4x is stored in the teleconverter lens data storage area 126C. Note that TC1 1.4x is an example showing the type of the teleconverter 300. Further, the individual storage area 126E is a reserved area 1 (described as Reserve 1 in FIG. 8) in which differential data of the lens data for a teleconverter is stored, the individual storage area 126F is a reserved area 2 (described as Reserve 2 in FIG. 8) in which differential data of the lens data for a teleconverter is stored, and the individual storage area 126G is a reserved area 3 (described as Reserve 3 in FIG. 8) in which differential data of the lens data for a teleconverter is stored. The writing unit 125 writes (stores) the lens data in the reservation storage areas.

In a case where the specifying unit 121 has specified the teleconverter 300 and differential data corresponding to the specified teleconverter 300 is stored, the lens control unit 123 switches a start address of the lens data to be transmitted, which is stored in the flash ROM 126.

Figure 9:
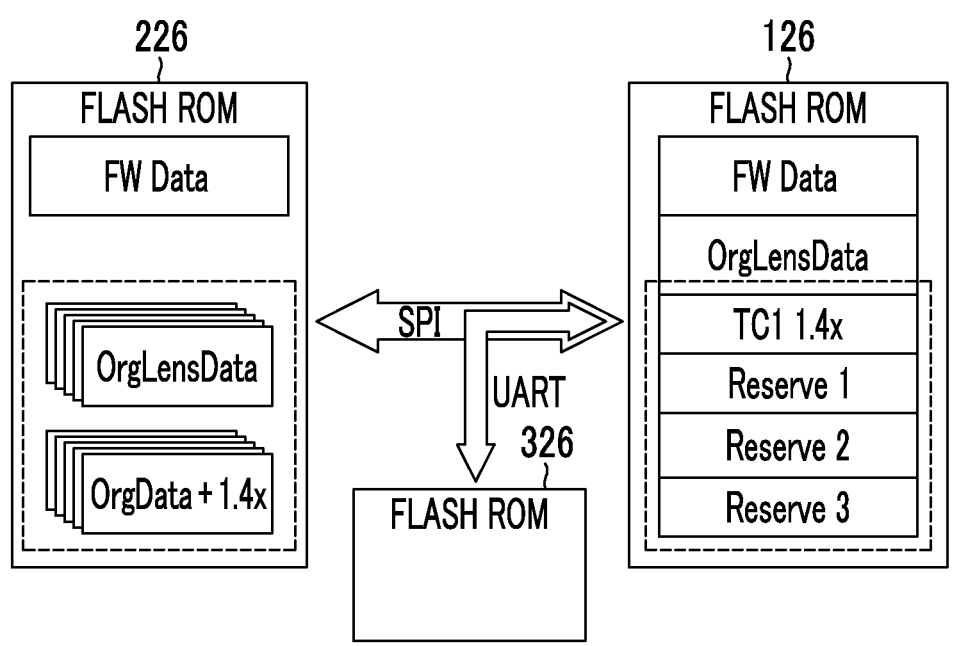
FIG. 9 is a diagram conceptually illustrating a camera body, a teleconverter, and an interchangeable lens.

FIG. 9 is a diagram conceptually illustrating the flash ROM 226 of the camera body 200, the flash ROM 326 of the teleconverter 300, and the flash ROM 126 of the interchangeable lens 100.

Since storage of data in the flash ROM 126 of the interchangeable lens 100 is the same as that described with reference to FIG. 8, description thereof is omitted. Further, storage of data in the flash ROM 326 of the teleconverter 300 is also omitted.

Firmware, original lens data already downloaded from the interchangeable lens 100, and lens data for a teleconverter correction already downloaded from the interchangeable lens 100 (described as OrgData+1.4x in FIG. 9) are stored in the flash ROM 226 of the camera body 200. Original lens data once downloaded and the lens data for a teleconverter are stored in the flash ROM 226 of the camera body 200. Accordingly, it is unnecessary to download the lens data from the interchangeable lens 100 in a case where the same interchangeable lens 100 or a combination of the same interchangeable lens 100 and the teleconverter 300 is mounted on the camera body 200.

Note that, as described with reference to FIG. 5, communication between the interchangeable lens 100 and the camera body 200 is performed by SPI communication, and communication between the interchangeable lens 100 and the teleconverter 300 is performed by UART communication.

FIG. 10 is a diagram illustrating original lens data and differential data. Part (A) of FIG. 10 is a diagram conceptually illustrating a data configuration example of original lens data. Further, part (B) of FIG. 10 illustrates a category information management table of the differential data.

Part (A) of FIG. 10 illustrates an example of the original lens data. A lens data address (LensDataAdrr) is attached to the lens data. Further, a packet number (PacketNo) is attached to each packet size of 2 KByte (kilobytes).

In part (B) of FIG. 10, an element number (Elemt No.), a packet number (Packet No.), an offset (Offset), a size (Size), and a differential data address (TcData Addr) are associated with the differential data (TcData) and described. Note that the element number is a teleconverter division data number, and is a number attached to each block constituting the differential data. The packet number is a number of a packet to be transmitted in the case of transmission to the camera body 200, and the offset is an offset from a head of a current packet. Further, the size is a size of a block constituting the differential data, that is, a size for replacing original lens data with the differential data (block), and the differential data address indicates an address in the differential data.

Figure 11:
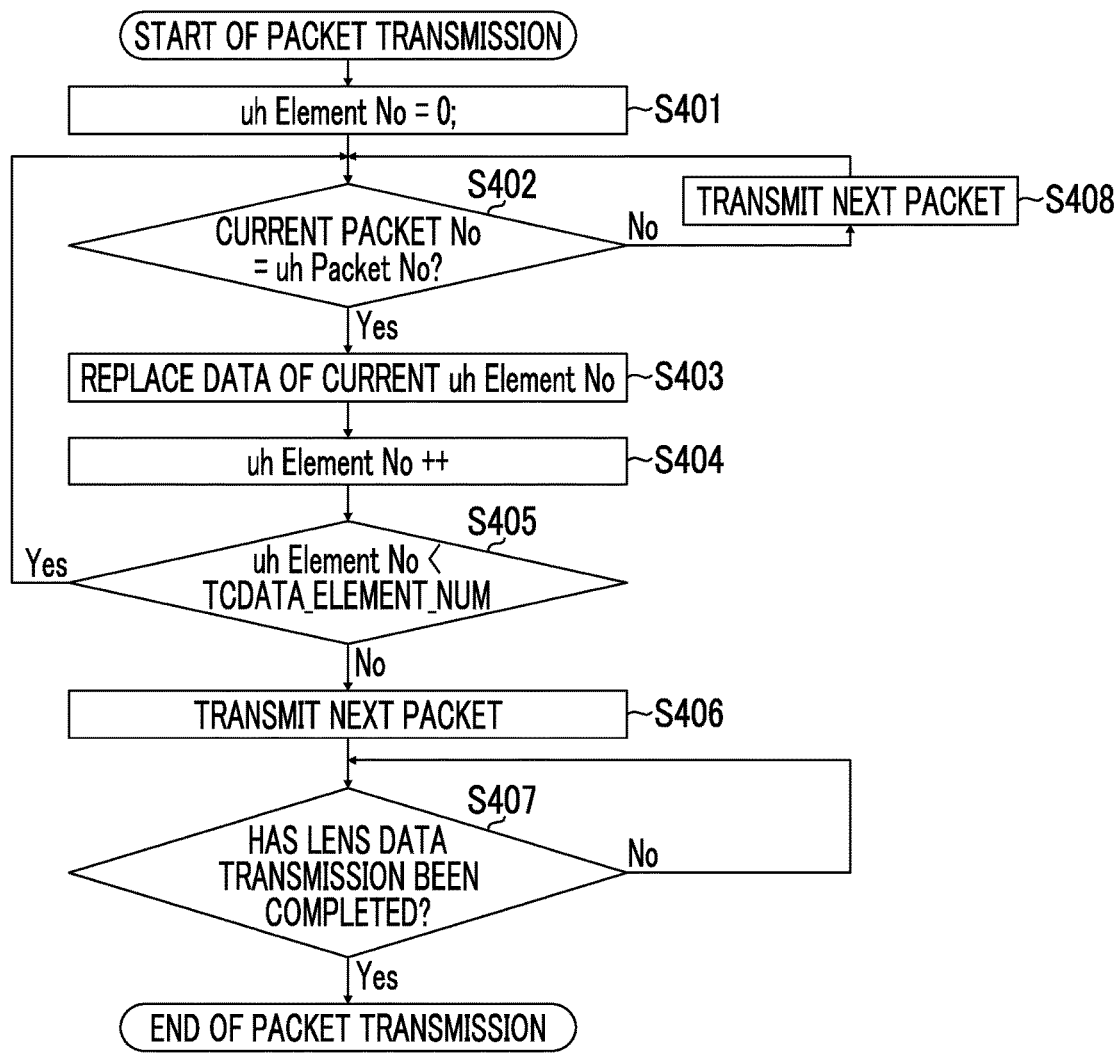
FIG. 11 is an operation flow regarding generation of lens data for a teleconverter.

FIG. 11 illustrates an operation flow regarding generation of lens data for a teleconverter performed by the third lens data generation unit 129.

First, the third lens data generation unit 129 refers to the table data described with reference to part (B) of FIG. 10 for the block of differential data of element number (uh Element No: replacement data block No.) 0 to recognize a packet number of the packet to be transmitted (step S401). Note that step S401 is sequentially executed from element number 0 (uh Element No=0;) according to the element number of the differential data.

Then, the third lens data generation unit 129 determines whether or not the packet number (uh Packet No: transmission packet number) of the packet to be transmitted to the camera body 200 is a packet number that currently transmits a block with element number 0. Specifically, since the block with element number 0 is transmitted with packet number 1, the third lens data generation unit 129 determines whether or not the packet with packet number 1 is transmitted (step S402). In a case where the packet number is not packet number 1 for transmitting the block with element number 0 (No in step S402), there is no replacement of differential data, and therefore, the lens control unit 123 transmits the next packet.

On the other hand, in a case where the packet number is packet number 1 for transmitting the block with element number 0 (Yes in step S402), the third lens data generation unit 129 performs replacement of the block of the differential data (step S403). Note that, for example, in a case where a plurality of blocks are transmitted in one packet, like the blocks of element numbers 1 and 2 or the blocks of element numbers 3 and 4 illustrated in part (B) of FIG. 10, the third lens data generation unit 129 further executes replacement in the packet to be transmitted, using the block (uh Element No++) to which the element number has been added (step S404).

Thereafter, the third lens data generation unit 129 compares the number of blocks (TCDA_ELEMENT_NUM: the number of data blocks for replacement) with the replaced element number (step S405). In a case where the element number is smaller than the number of blocks (Yes in step S405), the process returns to step S402.

On the other hand, the third lens data generation unit 129 compares the number of blocks with the replaced element number. In a case where the element number is not smaller than the number of blocks (No in step S405), the lens control unit 123 transmits the next packet (step S406). The lens control unit 123 determines whether or not the transmission of the lens data for a teleconverter to the camera body 200 has been completed (step S407), and completes the transmission of the lens data for a teleconverter.

Next, a case where new lens data is added to and stored in the flash ROM 126 of the interchangeable lens 100 will be described. In a case where differential data corresponding to the accessory specified by the specifying unit 121 is not stored in the flash ROM 126, the lens control unit 123 acquires the differential data using the second lens data acquisition unit 127, and the writing unit 125 writes the differential data to the teleconverter lens data storage area (126D to 126G in FIG. 8) of the flash ROM 126.

Figure 12:
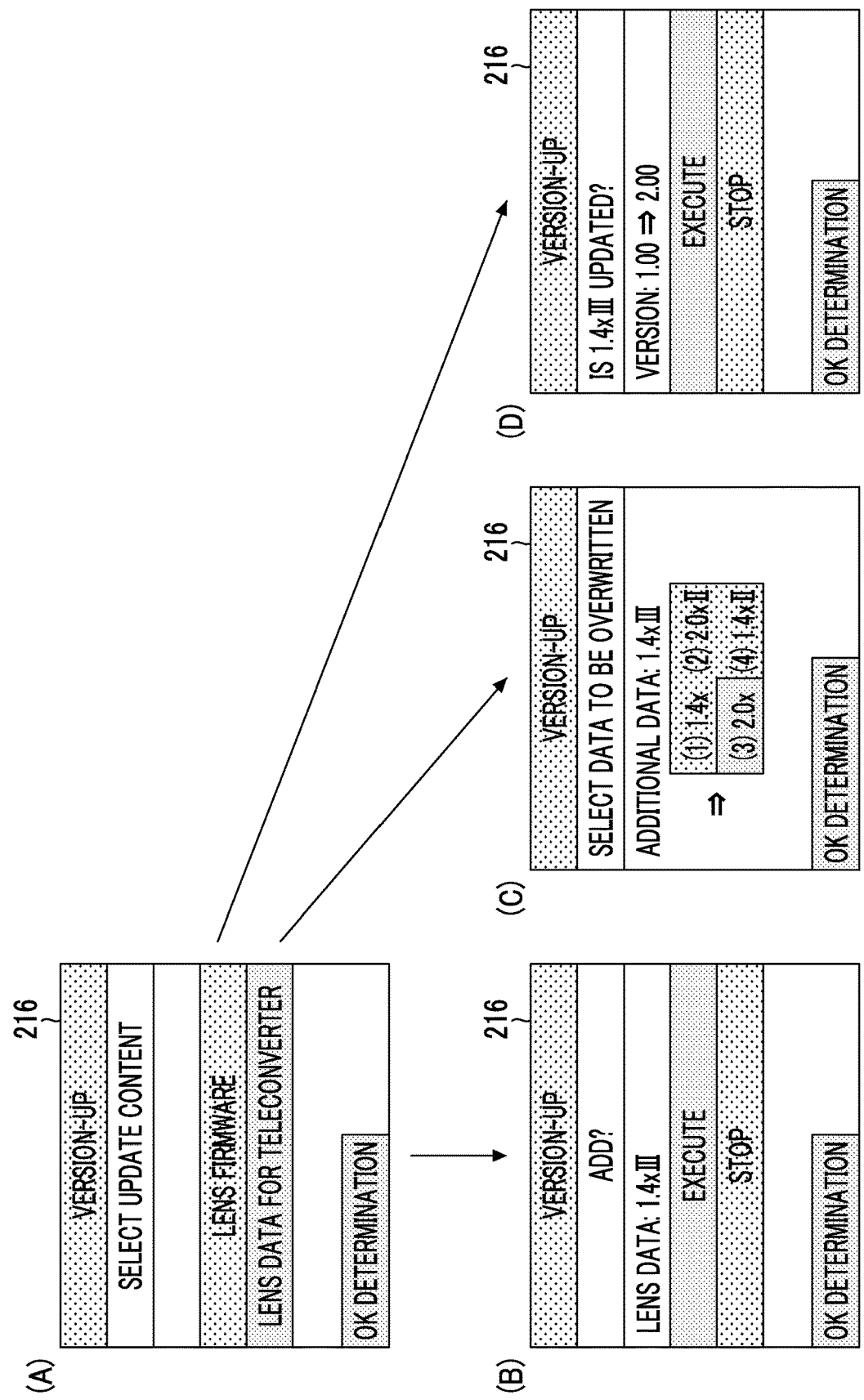
FIG. 12 is a diagram illustrating a display aspect of a monitor.

FIG. 12 is a diagram illustrating an example of a display aspect of the monitor (a display unit) 216 of the camera body 200 in a case where new differential data is added. FIG. 12(A) is a diagram illustrating a display in a case where selection of updating of the lens data for a teleconverter is performed. In the case illustrated in FIG. 12(A), selection is performed as to whether version-up of the lens firmware is performed or addition of lens data for a teleconverter is performed in the monitor 216. Selection by the user is performed by the MENU/OK key 27 or the cross key 28 (FIG. 2).

FIGS. 12(B) to 12(D) illustrate display examples of the monitor 216 in a case where the addition of the lens data for a teleconverter is selected in FIG. 12(A).

FIG. 12(B) illustrates a case where differential data regarding "1.4xIII" (product name of the teleconverter) of the teleconverter 300 is added to the individual storage area 126E (reserved area 1) (see FIG. 8). In this case, since the storage capacity of the differential data to be added remains in the flash ROM 126, the differential data of "1.4xIII" is stored without overwriting differential data already stored. By the user selecting and deciding execution, the differential data is written to the reserved area 1 of the flash ROM 126. Note that the differential data of "1.4xIII" to be written is taken into the camera body 200 via the media control unit 210 by the memory card 212 and transmitted to the interchangeable lens 100 under the control of the body-side CPU 220.

FIG. 12(C) illustrates a display example in the monitor 216 in a case where there is no remaining capacity for storing additional differential data in the flash ROM 126. In the case illustrated in FIG. 12(C), a type of differential data already stored is displayed on the monitor 216, the differential data for overwriting is selected by the user, and the selected differential data is overwritten with the differential data.

That is, the display control unit 214 displays the type of differential data already stored in the flash ROM 126 of the interchangeable lens 100 acquired via the camera data communication control unit of the camera body 200 which is realized by the body-side CPU 220. The user selects differential data for overwriting from the displayed type of the differential data. The selection from the user is accepted by the MENU/OK key 27 or the cross key 28 (FIG. 2).

In the case illustrated in FIG. 12(C), "2.0x" is selected by the user and overwritten by the writing unit 125.

FIG. 12(D) is an example of a display on the monitor 216 in a case where version-up of the lens data for a teleconverter is performed (in a case where version-up of the differential data is performed). FIG. 12(D) illustrates a case where the version-up of "1.4xIII" from 1.00 to 2.00 is performed. In a case where the user selects execution, the writing unit 125 overwrites the differential data stored in the flash ROM 126 with the differential data acquired by the second lens data acquisition unit 127 in the case of version-up of the differential data.

The above-described configurations and functions can be appropriately realized by any hardware, any software, or a combination of both. For example, the present invention can also be applied to a program causing a computer to execute the above-described processing steps (processing procedures), a computer-readable recording medium (a non-temporary recording medium) having such a program recorded thereon, or a computer in which such a program can be installed.

Although the examples of the present invention have been described above, it is obvious that the present invention is not limited to the above-described embodiments, and various modifications can be made without departing from the spirit of the present invention.

EXPLANATION OF REFERENCES

10: Imaging device
20: Optical finder window
22: Shutter release button
23: Shutter speed dial
24: Exposure correction dial
26: Eyepiece portion
27: MENU/OK key
28: Cross key
29: Playback button
100: Interchangeable lens
102: Imaging optical system
104: Zoom lens
106: Focus lens
108: Diaphragm
120: Lens-side CPU
121: Specifying unit
123: Lens control unit
125: Writing unit
200: Camera body
220: Body-side CPU
300: Teleconverter
320: Teleconverter-side CPU

What is claimed is:

1. A camera system comprising at least an interchangeable lens and a camera body, wherein:
   the interchangeable lens includes
   a first mount including a plurality of terminals on which an accessory or a camera body is mounted;
   a specifying unit that determines whether or not the accessory is mounted on the first mount and specifies the mounted accessory by acquiring identification information from the accessory in a case where it is determined that the accessory is mounted;

a storage unit including a first storage area for storing first lens data which is lens data in a case where the accessory is not mounted, and a second storage area for storing one or a plurality of pieces of second lens data, the second lens data being differential data between lens data in a case where the accessory is mounted, the lens data being obtained by correcting the first lens data on the basis of optical characteristics of the accessory, and the first lens data;

a third lens data generation unit that generates third lens data that is lens data obtained by correcting the first lens data on the basis of the optical characteristics of the accessory using the second lens data as the differential data and the first lens data;

a lens control unit that transfers the first lens data stored in the storage unit or the third lens data generated by the third lens data generation unit to the camera body on the basis of a result output from the specifying unit in a case where there is a lens data acquisition request from the camera body;

a second lens data acquisition unit that acquires new second lens data to be written to the second storage area of the storage unit; and a writing unit that writes the second lens data acquired by the second lens data acquisition unit to the second storage area of the storage unit, wherein the lens control unit acquires the second lens data from the camera body using the second lens data acquisition unit in a case where the second lens data corresponding to the accessory specified by the specifying unit is not stored in the storage unit, the camera body includes a second mount including a plurality of terminals on which the interchangeable lens or the accessory is mounted;

an external input unit to which the second lens data is input;

a camera data communication control unit that controls communication of data with the interchangeable lens;

a display unit;

a selection reception unit that receives a selection of a user; and a display control unit that controls a display on the display unit, wherein the camera data communication control unit transmits the second lens data input by the external input unit to the interchangeable lens, the lens control unit of the interchangeable lens transmits data regarding a type of the second lens data already stored in the storage unit to the camera body in a case where the capacity in which storage is allowed in the storage unit is smaller than a necessary capacity of the second lens data acquired by the second lens data acquisition unit, the display control unit of the camera body acquires the data regarding the type of second lens data stored in the storage unit via the camera data communication control unit and displays the data regarding the type of second lens data stored in the storage unit on the display unit, the selection reception unit of the camera body receives a selection of one type from types of second lens data displayed on the display unit, and the writing unit of the interchangeable lens overwrites the second lens data received by the selection reception unit with the second lens data acquired by the second lens data acquisition unit.

2. The camera system according to claim 1,
wherein the lens control unit of the interchangeable lens transfers the first lens data stored in the storage unit to the camera body in a case where the specifying unit determines that the accessory is not mounted on the first mount, and transfers the third lens data to the camera body in a case where the specifying unit determines that the accessory is mounted on the first mount and the second lens data corresponding to the accessory specified by the specifying unit is stored in the storage unit.

3. The camera system according to claim 1,
wherein in a case where the second lens data corresponding to the accessory specified by the specifying unit is not stored in the storage unit, the lens control unit of the interchangeable lens acquires the second lens data using the second lens data acquisition unit, and the writing unit writes the second lens data to the second storage area of the storage unit.

4. The camera system according to claim 2,
wherein in a case where the second lens data corresponding to the accessory specified by the specifying unit is not stored in the storage unit, the lens control unit of the interchangeable lens acquires the second lens data using the second lens data acquisition unit, and the writing unit writes the second lens data to the second storage area of the storage unit.

5. The camera system according to claim 1, wherein the second lens data acquisition unit of the interchangeable lens acquires the second lens data from the camera body.

6. The camera system according to claim 2, wherein the second lens data acquisition unit of the interchangeable lens acquires the second lens data from the camera body.

7. The camera system according to claim 3, wherein the second lens data acquisition unit of the interchangeable lens acquires the second lens data from the camera body.

8. The camera system according to claim 4, wherein the second lens data acquisition unit of the interchangeable lens acquires the second lens data from the camera body.

9. The camera system according to claim 1, wherein the interchangeable lens further includes a second lens data generation unit that calculates the second lens data on the basis of data acquired from the camera body, and
the second lens data acquisition unit acquires the second lens data from the second lens data generation unit.

10. The camera system according to claim 2, wherein the interchangeable lens further includes a second lens data generation unit that calculates the second lens data on the basis of data acquired from the camera body, and
the second lens data acquisition unit acquires the second lens data from the second lens data generation unit.

11. The camera system according to claim 3, wherein the interchangeable lens further includes a second lens data generation unit that calculates the second lens data on the basis of data acquired from the camera body, and
the second lens data acquisition unit acquires the second lens data from the second lens data generation unit.

12. The camera system according to claim 4, wherein the interchangeable lens further includes a second lens data generation unit that calculates the second lens data on the basis of data acquired from the camera body, and
the second lens data acquisition unit acquires the second lens data from the second lens data generation unit.

13. The camera system according to claim 1, wherein the writing unit of the interchangeable lens overwrites the second lens data stored in the storage unit with the second lens data acquired by the second lens data acquisition unit according to a capacity in which storage is allowed in the storage unit.

14. The camera system according to claim 2, wherein the writing unit of the interchangeable lens overwrites the second lens data stored in the storage unit with the second lens data acquired by the second lens data acquisition unit according to a capacity in which storage is allowed in the storage unit.

15. The camera system according to claim 3, wherein the writing unit of the interchangeable lens overwrites the second lens data stored in the storage unit with the second lens data acquired by the second lens data acquisition unit according to a capacity in which storage is allowed in the storage unit.

16. The camera system according to claim 4, wherein the writing unit of the interchangeable lens overwrites the second lens data stored in the storage unit with the second lens data acquired by the second lens data acquisition unit according to a capacity in which storage is allowed in the storage unit.

17. The camera system according to claim 5, wherein the writing unit of the interchangeable lens overwrites the second lens data stored in the storage unit with the second lens data acquired by the second lens data acquisition unit according to a capacity in which storage is allowed in the storage unit.

18. The camera system according to claim 1, wherein in a case where the second lens data to be written to the storage unit is version-up of the second lens data already stored in the storage unit, the writing unit of the interchangeable lens overwrites the second lens data stored in the storage unit with the second lens data acquired by the second lens data acquisition unit.

19. A communication method of a camera system, wherein the camera system comprises a first mount including a plurality of terminals on which an accessory or a camera body is mounted, and a storage unit including a first storage area for storing first lens data which is lens data in a case where the accessory is not mounted, and a second storage area for storing one or a plurality of pieces of second lens data, the second lens data being differential data between lens data in a case where the accessory is mounted, the lens data being obtained by correcting the first lens data on the basis of optical characteristics of the accessory, and the first lens data, the communication method comprising:
  a step of determining whether or not the accessory is mounted on the first mount and specifying the mounted accessory by acquiring identification information from the accessory in a case where it is determined that the accessory is mounted;
  a step of generating third lens data that is lens data obtained by correcting the first lens data on the basis of the optical characteristics of the accessory using the second lens data as the differential data and the first lens data;
  a step of transferring the first lens data stored in the storage unit or the third lens data generated in the third lens data generation step to the camera body on the basis of a result output in the specifying step in a case where there is a lens data acquisition request from the camera body; and
  a step of writing the second lens data to the second storage area of the storage unit.

20. A non-transitory recording medium readable by a computer for recording a program for performing communication of a camera system, wherein the camera system comprises a first mount including a plurality of terminals on which an accessory or a camera body is mounted, and a storage unit including a first storage area for storing first lens data which is lens data in a case where the accessory is not mounted, and a second storage area for storing one or a plurality of pieces of second lens data, the second lens data being differential data between lens data in a case where the accessory is mounted, the lens data being obtained by correcting the first lens data on the basis of optical characteristics of the accessory, and the first lens data, the program causing the computer to execute:
  a step of determining whether or not the accessory is mounted on the first mount and specifying the mounted accessory by acquiring identification information from the accessory in a case where it is determined that the accessory is mounted;
  a step of generating third lens data that is lens data obtained by correcting the first lens data on the basis of the optical characteristics of the accessory using the second lens data as the differential data and the first lens data;
  a step of transferring the first lens data stored in the storage unit or the third lens data generated in the third lens data generation step to the camera body on the basis of a result output in the specifying step in a case where there is a lens data acquisition request from the camera body; and
  a step of writing the second lens data to the second storage area of the storage unit.

* * * * *